US 12,455,273 B2

(12) United States Patent
Sanden et al.

(10) Patent No.: US 12,455,273 B2
(45) Date of Patent: Oct. 28, 2025

(54) MULTIPLE-SENSOR ANALYSIS OF GEOLOGICAL SAMPLES

(71) Applicant: ENERSOFT INC., Calgary (CA)

(72) Inventors: Grant I. Sanden, Calgary (CA); Yannai Z. R. Segal, Calgary (CA)

(73) Assignee: ENERSOFT INC., Calgary (CA)

( * ) Notice: Subject to any disclaimer, the term of this patent is extended or adjusted under 35 U.S.C. 154(b) by 238 days.

(21) Appl. No.: 18/185,298

(22) Filed: Mar. 16, 2023

(65) Prior Publication Data

US 2023/0213494 A1 Jul. 6, 2023

Related U.S. Application Data

(63) Continuation of application No. PCT/IB2021/058425, filed on Sep. 15, 2021.

(60) Provisional application No. 63/079,236, filed on Sep. 16, 2020.

(51) Int. Cl.
*G01N 21/00* (2006.01)
*G01N 23/00* (2006.01)
*G01N 33/24* (2006.01)

(52) U.S. Cl.
CPC .................. *G01N 33/24* (2013.01)

(58) Field of Classification Search
CPC ........ G01N 21/00; G01N 21/17; G01N 23/00; G01N 33/24
See application file for complete search history.

(56) References Cited

U.S. PATENT DOCUMENTS

| | | |
|---|---|---|
| 3,889,113 A | 6/1975 | Rhodes |
| 4,560,275 A | 12/1985 | Goetz |
| 4,852,135 A | 7/1989 | Anisovich et al. |
| 5,107,527 A | 4/1992 | Sipila et al. |
| 5,187,727 A | 2/1993 | Vogler et al. |
| 5,325,416 A | 6/1994 | Saito et al. |
| 5,657,363 A | 8/1997 | Hossain et al. |
| 5,712,891 A | 1/1998 | Benony et al. |
| 5,721,759 A | 2/1998 | Raatikainen |
| 5,742,658 A | 4/1998 | Tiffin et al. |
| 5,832,054 A | 11/1998 | Kuwabara |
| 5,883,583 A | 3/1999 | Kishino |
| 5,937,026 A | 8/1999 | Satoh |
| 6,052,429 A | 4/2000 | Ohno et al. |
| 6,108,398 A | 8/2000 | Mazor et al. |

(Continued)

FOREIGN PATENT DOCUMENTS

| | | |
|---|---|---|
| CA | 2720667 A1 | 10/2009 |
| CA | 2750255 | 7/2010 |

(Continued)

OTHER PUBLICATIONS

EP-3799580-B1 Machine Translation (Year: 2022).*

(Continued)

*Primary Examiner* — Nguyen Q. Ha
(74) *Attorney, Agent, or Firm* — Smith Baluch LLP

(57) ABSTRACT

Systems, methods and devices for improved analysis of geological samples through the coordinated use of multiple sensors. Among other advantages, the invention offers significant advances in the accuracy, ease, and speed with which substances found in single samples, and/or across multiple samples, can be identified, mapped, and otherwise analyzed.

44 Claims, 13 Drawing Sheets

(56) References Cited

U.S. PATENT DOCUMENTS

| | | |
|---|---|---|
| 6,233,307 B1 | 5/2001 | Golenhofen |
| 6,266,390 B1 | 7/2001 | Sommer, Jr. et al. |
| 6,292,532 B1 | 9/2001 | Kawahara et al. |
| 6,295,333 B1 | 9/2001 | Tamura |
| 6,314,158 B1 | 11/2001 | Shiota et al. |
| 6,345,086 B1 | 2/2002 | Ferrandino et al. |
| 6,370,220 B1 | 4/2002 | Stoop |
| 6,381,303 B1 | 4/2002 | Vu et al. |
| 6,400,795 B2 | 6/2002 | Yagi |
| 6,421,415 B1 | 7/2002 | Peczkis et al. |
| 6,426,993 B1 | 7/2002 | Satoh |
| 6,453,002 B1 | 9/2002 | Mazor et al. |
| 6,477,227 B1 | 11/2002 | Kaiser et al. |
| 6,512,810 B1 | 1/2003 | Haszler et al. |
| 6,522,718 B2 | 2/2003 | Sato |
| 6,577,705 B1 | 6/2003 | Chang et al. |
| 6,677,162 B1 | 1/2004 | Wendelbo et al. |
| 6,697,454 B1 | 2/2004 | Nicolich et al. |
| 6,754,304 B1 | 6/2004 | Kumakhov |
| 6,801,595 B2 | 10/2004 | Grodzins et al. |
| 6,806,093 B2 | 10/2004 | Wendelbo et al. |
| 6,810,106 B2 | 10/2004 | Sato |
| 6,823,041 B2 | 11/2004 | Greenbank et al. |
| 6,826,253 B2 | 11/2004 | Greenbank et al. |
| 6,826,483 B1 | 11/2004 | Anderson et al. |
| 6,850,592 B2 | 2/2005 | Schramm et al. |
| 6,881,363 B2 | 4/2005 | Carlson et al. |
| 6,952,260 B2 | 10/2005 | Xiao |
| 6,980,283 B1 | 12/2005 | Aggarwal |
| 7,020,238 B1 | 3/2006 | Kantonen et al. |
| 7,065,174 B2 | 6/2006 | Sipila et al. |
| 7,229,064 B2 | 6/2007 | Miller et al. |
| 7,233,643 B2 | 6/2007 | Sipila et al. |
| 7,277,527 B2 | 10/2007 | Gallagher |
| 7,298,817 B2 | 11/2007 | Chen et al. |
| 7,342,995 B2 | 3/2008 | Sato et al. |
| 7,356,114 B2 | 4/2008 | Kataoka et al. |
| 7,375,359 B1 | 5/2008 | Grodzins |
| 7,409,037 B2 | 8/2008 | Puusaari et al. |
| 7,410,804 B2 | 8/2008 | Wendelbo et al. |
| 7,424,093 B2 | 9/2008 | Fukai et al. |
| 7,428,293 B2 | 9/2008 | Fukai et al. |
| 7,430,273 B2 | 9/2008 | Yellepeddi |
| 7,430,274 B2 | 9/2008 | Connors et al. |
| 7,436,926 B2 | 10/2008 | Matoba et al. |
| 7,440,541 B2 | 10/2008 | Hubbard-Nelson et al. |
| 7,443,951 B2 | 10/2008 | Kenning et al. |
| 7,515,685 B2 | 4/2009 | Iwamoto et al. |
| 7,518,722 B2 | 4/2009 | Julian et al. |
| 7,535,989 B2 | 5/2009 | Russell et al. |
| 7,587,025 B2 | 9/2009 | Fukai et al. |
| 7,623,621 B1 | 11/2009 | Schramm, Jr. |
| 7,623,625 B2 | 11/2009 | Boyden et al. |
| 7,627,088 B2 | 12/2009 | Matoba et al. |
| 7,634,053 B2 | 12/2009 | Matoba |
| 7,634,054 B2 | 12/2009 | Matoba et al. |
| 7,652,765 B1 | 1/2010 | Geshwind et al. |
| 7,653,174 B2 | 1/2010 | Mazor et al. |
| 7,657,414 B2 | 2/2010 | Zamora et al. |
| 7,680,243 B2 | 3/2010 | Yokhin et al. |
| 7,680,248 B2 | 3/2010 | Matoba |
| 7,688,942 B2 | 3/2010 | Klein |
| 7,763,820 B1 | 7/2010 | Sommer, Jr. et al. |
| 7,796,726 B1 | 9/2010 | Gendreau et al. |
| 7,916,834 B2 | 3/2011 | Piorek et al. |
| 7,970,101 B2 | 6/2011 | Sakai et al. |
| 7,978,820 B2 | 7/2011 | Kharchenko et al. |
| 7,983,386 B2 | 7/2011 | Yellepeddi et al. |
| 8,000,439 B2 | 8/2011 | Matoba |
| 8,018,586 B2 | 9/2011 | Genio et al. |
| 8,064,570 B2 | 11/2011 | Tannian et al. |
| 8,068,583 B2 | 11/2011 | Matoba et al. |
| 8,154,732 B2 | 4/2012 | Bodkin et al. |
| 8,155,268 B2 | 4/2012 | Pesce et al. |
| 8,238,515 B2 | 8/2012 | Birnbaum et al. |
| 8,380,541 B1 | 2/2013 | Holmes |
| 8,408,789 B2 | 4/2013 | Takahara |
| 8,494,113 B2 | 7/2013 | Grodzins |
| 8,515,720 B2 | 8/2013 | Koutsabeloulis et al. |
| 8,548,121 B2 | 10/2013 | Sakai |
| 8,550,710 B2 | 10/2013 | Kishida et al. |
| 8,582,717 B2 | 11/2013 | Ohzawa |
| 8,611,493 B2 | 12/2013 | Hasegawa et al. |
| 8,693,625 B2 | 4/2014 | Dugas et al. |
| 8,787,523 B2 | 7/2014 | Sackett |
| 8,793,111 B2 | 7/2014 | Tilke et al. |
| 8,835,857 B2 | 9/2014 | Eggert |
| 8,855,809 B2 | 10/2014 | Spencer et al. |
| 8,922,783 B2 | 12/2014 | Bodkin |
| 8,982,338 B2 | 3/2015 | Hamilton et al. |
| 9,057,685 B2 | 6/2015 | Allen et al. |
| 9,360,367 B2 | 6/2016 | Day et al. |
| 9,415,392 B2 | 8/2016 | Ismagilov et al. |
| 9,449,781 B2 | 9/2016 | Yun et al. |
| 9,476,810 B2 | 10/2016 | Gottlieb |
| 9,696,260 B2 | 7/2017 | Motto-Ros et al. |
| 9,756,219 B2 | 9/2017 | Konno et al. |
| 9,810,649 B2 | 11/2017 | Takahara et al. |
| 10,041,833 B1 | 8/2018 | Chirayath |
| 10,207,296 B2 | 2/2019 | Garcia et al. |
| 10,242,126 B2 | 3/2019 | Zhdanov |
| 10,247,683 B2 | 4/2019 | Yun et al. |
| 10,295,486 B2 | 5/2019 | Yun et al. |
| 10,429,238 B2 | 10/2019 | Inoue et al. |
| 10,473,598 B2 | 11/2019 | Ogata et al. |
| 10,570,732 B2 | 2/2020 | Lawie et al. |
| 10,634,628 B2 | 4/2020 | Kasper et al. |
| 10,800,315 B2 | 10/2020 | Kanck et al. |
| 10,823,688 B2 | 11/2020 | Akiyama et al. |
| 10,948,435 B2 | 3/2021 | Furukawa |
| 10,983,062 B2 | 4/2021 | Özcan et al. |
| 11,037,283 B2 | 6/2021 | Jang et al. |
| 11,120,540 B2 | 9/2021 | Mairhofer |
| 11,320,384 B2 | 5/2022 | Grof et al. |
| 11,333,649 B2 | 5/2022 | Lalović |
| 11,352,879 B2 | 6/2022 | Li et al. |
| 11,519,868 B2 | 12/2022 | Verboomen et al. |
| 11,592,407 B2 | 2/2023 | Segal et al. |
| 11,733,185 B2 | 8/2023 | Ogata et al. |
| 12,181,429 B2 | 12/2024 | Pitta' et al. |
| 2003/0127776 A1 | 7/2003 | Carlson et al. |
| 2005/0090019 A1 | 4/2005 | Wendelbo et al. |
| 2005/0165555 A1 | 7/2005 | Jackson |
| 2005/0216197 A1 | 9/2005 | Zamora et al. |
| 2006/0038997 A1 | 2/2006 | Julian et al. |
| 2010/0106456 A1 | 4/2010 | Genio et al. |
| 2010/0185427 A1 | 7/2010 | Tilke et al. |
| 2011/0246154 A1 | 10/2011 | Koutsabeloulis et al. |
| 2013/0179130 A1 | 7/2013 | Zhandov |
| 2014/0029004 A1 | 1/2014 | Bodkin |
| 2014/0048972 A1 | 2/2014 | Gottlieb |
| 2014/0183607 A1 | 7/2014 | Liu |
| 2014/0204377 A1 | 7/2014 | Day et al. |
| 2014/0379317 A1 | 12/2014 | Sanden et al. |
| 2015/0163378 A1 | 6/2015 | Konno et al. |
| 2015/0226673 A1 | 8/2015 | Motto-Ros et al. |
| 2015/0253263 A1* | 9/2015 | Feser ............... G01N 23/2206 378/6 |
| 2017/0074652 A1 | 3/2017 | Send et al. |
| 2017/0321546 A1 | 11/2017 | Lawie et al. |
| 2018/0073923 A1 | 3/2018 | Inoue et al. |
| 2018/0275068 A1 | 9/2018 | Özcan et al. |
| 2018/0347354 A1 | 12/2018 | Li et al. |
| 2020/0184624 A1 | 6/2020 | Jang et al. |
| 2020/0193587 A1 | 6/2020 | Mairhofer |
| 2022/0397517 A1 | 12/2022 | McQuilkin et al. |

FOREIGN PATENT DOCUMENTS

| | | |
|---|---|---|
| CA | 2693247 | 8/2010 |
| DE | 102007016612 A1 | 10/2008 |
| DE | 102020132736 A1 | 6/2021 |
| EP | 2270479 A2 | 1/2011 |
| EP | 3062096 B1 | 8/2016 |

(56) References Cited

FOREIGN PATENT DOCUMENTS

| EP | 3799580 B1 | * | 1/2022 | ............ G01D 21/00 |
|---|---|---|---|---|
| WO | 2015189286 A1 | | 12/2015 | |
| WO | 2019213765 A1 | | 11/2019 | |
| WO | 2019218051 | | 11/2019 | |
| WO | 2019236339 | | 12/2019 | |
| WO | 2021176419 | | 9/2021 | |

OTHER PUBLICATIONS

Machine Translation of EP-3799580-B1 (Year: 2022).*

International Search Report; PCT/IB2021/058425 Dec. 14, 2021.

Barton et al. "Discrimination of Natural Fractures From Drilling-Induced Wellbore Failures in Wellbore Image Data—Implications for Reservoir Permeability". SPE Res Eval & Eng 5 (03): 249-254. Jun. 1, 2002 Paper No. SPE-78599-PA. https://doi.org/10.2118/78599-PA, Jun. 1, 2002, 6 pages.

Barton. "Discrimination of Natural Fractures from Drilling—Induced Wellbore Failures in Wellbore Image Data—Implications for Reservoir Permeability". Society of Petroleum Engineers. Feb. 1, 2000. doi: 10.2118/58993-MS, 8 pages.

Fox, et al. "Applications of hyperspectral mineralogy for geoenvironmental characterisation", Minerals Engineering, vol. 107, Sep. 18, 2016 (Sep. 18, 2016), ISSN: 0892-6875, DOI: 10.1016/J.MINENG.2016.11.008, Sep. 18, 2016, 15 pages.

ISA/CA, International Search Report, Dec. 14, 2021, re PCT International Patent app. No. PCT/IB2021/058425, 5 pages.

Kooima, et al. "Planetary-scale terrain composition." IEEE Transactions on Visualization and Computer Graphics 15.5 (2009): 719-733, Apr. 24, 2009, 15 pages.

Lypaczewski, et al. "Using hyperspectral imaging to vector towards mineralization at the Canadian Malartic gold deposit, Quebec, Canada", Ore Geology Reviews, Elsevier, Amsterdam, NL, vol. 111, ISSN: 0169-1368, DOI: 10.1016/J.OREGEOREV.2019.102945, May 25, 2019, 15 pages.

McCarthy, et al. "A GIS-based borehole data management and 3D visualization system." Computers & Geosciences 32.10 (2006): 1699-1708, Nov. 30, 2006, 11 pages.

Supplementary European Search Report dated Aug. 2, 2024, for European Patent No. 21868842.2, 2 pages.

Extended European Search Report in European App. No. 22826945.2, dated Apr. 14, 2025, 12 pages.

Paradis, et al. "ECORE: A New Fast Automated Quantitative Mineral and Elemental Core Scanner", Minerals, vol. 11, No. 8, Aug. 10, 2021 (Aug. 10, 2021), p. 859, XP093106816, DOI: 10.3390/min11080859 Retrieved from the Internet: URL:https://www.mdpi.com/2075-163X/ 11/8/859#:~:text=The%20new%20ECORE%20can%20scan,properties%20of%20the%20full%20tray, 16 pages.

Rifai, et al., "Emergences of New Technology for Ultrafast Automated Mineral Phase Identification and Quantitative Analysis Using the CORIOSITY Laser-Induced Breakdown Spectroscopy (LIBS) System", Minerals, vol. 10, No. 10, Oct. 16, 2020 (Oct. 16, 2020), p. 918, XP093266577, ISSN: 2075-163X, DOI: 10.3390/min10100918, 19 pages.

Rifai, et al., "Ultrafast Elemental Mapping of Platinum Group Elements and Mineral Identification in Platinum-Palladium Ore Using Laser Induced Breakdown Spectroscopy", Minerals, vol. 10, No. 3, Feb. 25, 2020 (Feb. 25, 2020), p. 207, XP093205412, ISSN: 2075-163X, DOI: 10.3390/min 10030207 Retrieved from the Internet: URL:https://www.mdpi.com/2075-163X/10/3/207/pdf &, 10 pages.

European Examination Report dated Jul. 30, 2025, for European Patent No. 21868842.2, 7 pages.

* cited by examiner

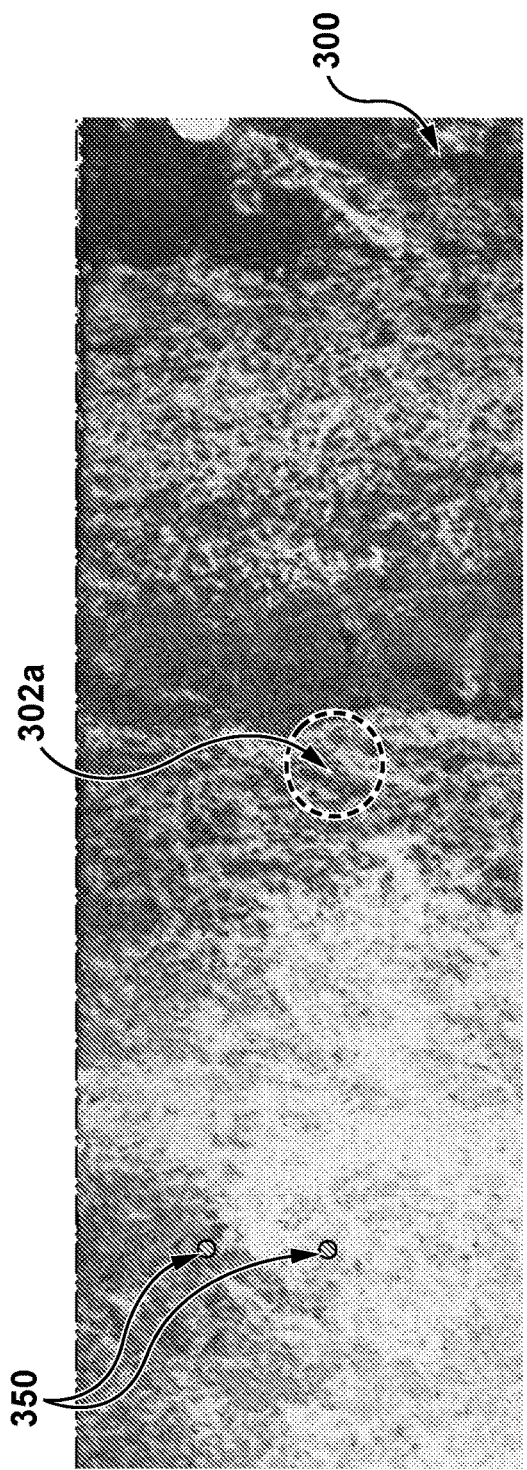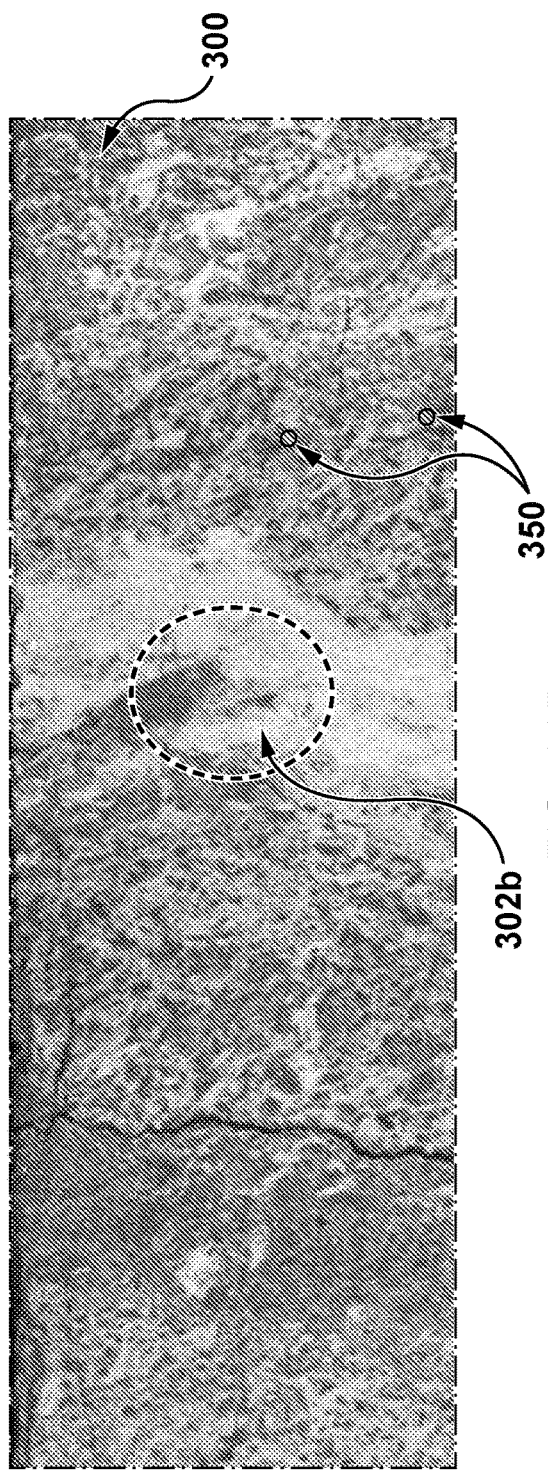
FIG. 11A
FIG. 11B

MULTIPLE-SENSOR ANALYSIS OF GEOLOGICAL SAMPLES

RELATED APPLICATION DATA

The present application is a continuation of international PCT patent application no. PCT/IB2021/058425, filed Sep. 15, 2021, which claims priority to, and the benefit of provisional U.S. patent application No. 63/079,236, filed Sep. 16, 2020, the content of both of these documents being incorporated by reference herein.

TECHNICAL FIELD

The present disclosure relates to improved systems, devices, and methods for analysis of geological samples, including fully and/or semi-automated multi-sensor systems and analyses configured for the rapid and efficient analysis of rocks, soil, and other geological substances; and related stored machine-readable instruction sets.

BACKGROUND

Understanding of mineral content and other aspects of geological regions and features can be beneficial to humans in many ways, including for example by ensuring access to vital materials and helping to understand and mitigate the effects of earthquakes and other geological phenomena.

However, the earth is vast, and known methods of obtaining and analyzing samples have tended to focus on the understanding of individual geological features and characteristics, one at a time.

As the importance of our understanding of our environment increases, so too does the importance of understanding the earth and its geological contents.

There is a need for improved systems, devices, and methods for analysis of geological samples, and for storage and processing of data related thereto.

SUMMARY

In various aspects and embodiments, and as further explained below, the present disclosure provides systems, devices, methods, and persistently-stored, machine-interpretable programming and/or other data products useful, among other things, for improving the quality, efficiency, and speed of analyses of substance samples, and particularly samples of geological substances, such as drill core samples.

For example, in various aspects and embodiments the invention provides multi-sensor geological analysis systems comprising a plurality of sensors, each sensor configured to capture data representing one or more physical attributes of at least one region of a geological sample. Some or all of the sensors are operable in accordance with a plurality of adjustable operating parameters, which can be fully or semi-automatically controlled in order to optimize or otherwise improve data scanning processes. Systems in accordance with such aspects and embodiments can comprise controllers configured to execute stored, machine-interpretable instructions configured to cause the controller to receive from operator input devices signals representing selection of some or all of the plurality of sensors, for use in capturing data representing one or more physical attributes of at least one region of a geological sample; and, in accordance with signals received by the controller from the same or another operator input device, set one or more adjustable operating parameters of one or more of the selected sensors operable in accordance with a plurality of adjustable operating parameters; cause the plurality of selected sensors to capture data representing a plurality of physical attributes of the at least one region of the geological sample; and cause some or all of the captured data to be stored in persistent machine-readable memory.

Among the many advantages offered by various aspects of the invention is the ability to use different sets of multi-sensor suites, in accordance with varying sets of sensor configurations, to perform iterative analyses of single geological samples, and/or to perform analyses conducted with respect to multiple samples, and correlate and expand data associated with the samples. Among the many purposes to which such data can be put is to rapidly and efficiently identify substances, for example by their association(s) with each other, and/or to build regional maps of geological deposits and other geological features.

In various embodiments, multi-sensor systems in accordance with the invention can be disposed on trailers, truck beds, pallets, chassis, and other frameworks for mobile service, for example by being towed or driven to analysis sites; or for stationary use in laboratories.

In further aspects and embodiments the invention provides methods useful in the analysis of geological samples, the methods performed by controllers of multi-sensor geological analysis systems and comprising receiving from operator input devices signals representing selections of some or all of various pluralities of sensors for use in collecting data representing physical attributes of portions of geological samples; and, in accordance with signals received by the controllers the same or other input devices, setting one or more adjustable operating parameters for some or all of the pluralities of selected sensors, causing the pluralities of selected sensors to capture data representing physical attributes the geological samples; and causing some or all of the captured data to be stored in persistent machine-readable memories. In various embodiments, such processes enable the use of multiple, potentially variable sets of multi-sensor suites, with optionally changeable sensor configurations, to perform iterative analyses of single geological samples, and/or to perform analyses conducted with respect to multiple samples and correlate and expand data associated with the samples. Such data can be used, for example, to build digital regional maps of geological deposits and other geological features.

For example, in various aspects and embodiments the invention provides both systems and methods for analyzing local and/or regional geological features, in which system controllers can be configured to receive from operator input devices signals representing a selections of pluralities of sensors for collection of data representing physical attributes of regions multiple geological samples associated with separate geographical locations; causing the plurality of selected sensors to capture geological data sets comprising data representing pluralities of physical attributes associated with the separate samples; and causing some or all of the data sets to be stored in persistent machine-readable memory; representing a plurality of physical attributes of the second geological sample.

In accordance with a first embodiment of the present disclosure, there is provided a method of analyzing geological features, the method performed by at least one controller of a multi-sensor geological analysis system and comprising: receiving from at least one operator input device one or more signals representing a first multi-sensor control instruction set, comprising data representing instructions for setting operating parameters of a first sensor set comprising one or more of a plurality of sensors, to configure the one or more sensors for collection of data representing one or more physical attributes of at least one common region of a geological sample associated with a geographical location; in accordance with instructions received from the at least one operator input device, causing the one or more configured sensors to capture a first geological attribute data set comprising data representing a plurality of physical attributes of the at least one common region of the geological sample; causing some or all of the first geological attribute data set to be stored in persistent machine-readable memory; receiving from the same or another operator input device one or more signals representing a second multi-sensor control instruction set comprising data representing instructions for setting operating parameters of a second sensor set comprising the same or another one or more sensors, for collection of data representing one or more physical attributes of the same or another common region of the same or another geological sample, the instructions based at least partly on attributes represented by the first geological attribute data set; in accordance with instructions received from the at least one operator input device, causing the second sensor set to capture a second geological attribute data set comprising data representing a plurality of the same or other physical attributes of the same or another common region of the geological sample; causing some or all of the second geological attribute data set to be stored in persistent machine-readable memory; and based at least partly on analysis of geological attributes represented by the first and second geological attribute data sets, identifying one or more substances comprised by the geological sample.

In some or all examples, setting the at least one adjustable operating parameter comprises at least one of: initializing at least one of the one or more sensors; physically or virtually orienting, focusing or tuning the at least one of the sensors; and setting a filter, color, wavelength, exposure time, aperture setting, or frequency range of the at least one of the sensors.

In some or all examples, setting the at least one adjustable operating parameter comprises causing the sensor to collect data associated with a known reference sample, and setting one or more of the adjustable operating parameters to optimize desired data collection characteristics of the sensor.

In some or all examples, the method comprises a plurality of sensors operable in accordance with respective adjustable operating parameters, wherein setting the at least one adjustable operating parameter for at least two such sensors comprises adjusting the sensors such that the sensors are configured to capture data from a commonly-defined spatial region.

In some or all examples, a relative orientation of at least one of the plurality of sensors with respect to a sample support is configurable by the controller in at least one degree of freedom, and the method comprises, in accordance with signals received by the controller from the same or another operator input device: changing a configuration of the at least one of the plurality of sensors relative to the sample support in at the least one degree of freedom.

In some or all examples, in which the first and second sets of captured data are associated with at least partially distinct portions of the geological sample, and the same or another controller causes the data to be geospatially correlated using mathematical covariance techniques.

In some or all examples, in which the first and second sets of captured data are associated with at least partially distinct portions of the geological sample, and the same or another controller causes the data to be geospatially correlated using spatial and spectral decomposition techniques.

In some or all examples, in which the first and second sets of captured data are associated with at least partially distinct portions of the geological sample, and the same or another controller causes the data to be geospatially correlated using tags physically associated with known positions relative to the geological sample.

In some or all examples, the method comprises filtering some or all of the captured data to generate enhanced attribute data sets representing optimized interpretations of attributes associated with portions of the geological sample.

In some or all examples, the method comprises, based at least partly on analysis of geological attributes represented by the first and second geological data sets, generating data representing a map of at least one geological feature associated with the first and second geographical locations.

In accordance with a second embodiment of the present disclosure, there is provided a method of analyzing geological features, the method performed by at least one controller of a multi-sensor geological analysis system and comprising: receiving from at least one operator input device one or more signals representing a selection of some or all of a plurality of sensors for collection of data representing one or more physical attributes of at least one common region of a first geological sample associated with a first geographical location; in accordance with instructions received from the at least one operator input device, causing the plurality of selected sensors to capture a first geological data set comprising data representing a plurality of physical attributes of the first geological sample; causing some or all of the first geological data set to be stored in persistent machine-readable memory; receiving from the same or another operator input device one or more signals representing a second selection of the same or another plurality of sensors for collection of data representing one or more physical attributes of at least one common region of a second geological sample associated with a second geographical location; in accordance with instructions received from the at least one operator input device, causing the plurality of sensors associated with the second selection to capture a second geological data set comprising data representing a plurality of physical attributes of the second geological sample; causing some or all of the second geological data set to be stored in persistent machine-readable memory; and based at least partly on analysis of geological attributes represented by the first and second geological data sets, generate data representing a map of at least one geological feature associated with the first and second geographical locations.

In accordance with a second embodiment of the present disclosure, there is provided a method of analyzing geological features, the method performed by at least one controller of a multiple-sensor geological analysis system, the method comprising: performing a first sensor scan of a first geological core sample in accordance with a first sensor control instruction set, the first sensor control instruction set representing instructions for setting operating parameters of a first sensor set for collection of data representing one or more physical attributes of a region of the first geological core sample, the first geological core sample being associated with a first geographical location, the first sensor scan generating a first geological attribute data set comprising data representing a plurality of physical attributes of the region of the first geological core sample, the first sensor set comprising one or more sensors; performing a second sensor scan of a second geological core sample in accordance with a second sensor control instruction set different from the first instruction set, the second sensor control instruction set comprising data representing instructions for setting operating parameters of a second sensor set for collection of data representing one or more physical attributes of a region of the second geological core sample, the second sensor control instruction set being based at least partly on physical attributes represented by the first geological attribute data set, the second sensor scan generating a second geological attribute data set comprising data representing a plurality of physical attributes of the region of the second geological core sample, the second geological core sample being associated with a second geographical location, the second sensor set comprising one or more sensors, wherein the one or more sensors of the second sensor set are the same or different from the one or more sensors of the first sensor set; and identifying one or more substances comprised by the first and second geological core samples based at least partly on analysis of geological attributes represented by the first and second geological attribute data sets.

In some or all examples, the one or more sensors comprise one or any combination of a red-green-blue (RGB) high-resolution digital camera, a spectrographic sensor, a hyperspectral sensor, an X-ray fluorescence (XRF) sensor, an ultraviolet (UV) fluorescence sensor, a three-dimensional profiling device, a laser-induced breakdown spectrometer (LIBS), gamma scintillation spectrometer, or thermal camera.

In some or all examples, the first and second geological core samples are the same; and the one or more sensors of the second sensor set are different from the one or more sensors of the first sensor set, the one or more sensors of the second sensor set used in the second sensor scan being based at least partly on physical attributes represented by the first geological attribute data set generated by the first sensor scan.

In some or all examples, the first and second geological core samples are the same; the one or more sensors of the second sensor set are the same as the one or more sensors of the first sensor set; and the operating parameters of the second sensor set used in the second sensor scan are different from the operating parameters of first sensor scan, the operating parameters of the second sensor set used in the second sensor scan being based at least partly on physical attributes represented by the first geological attribute data set generated by the first sensor scan.

In some or all examples, the first and second geological core samples are the same; the first sensor set comprises a three-dimensional profiling device; and the second sensor set comprises any one of a combination of a red-green-blue (RGB) high-resolution digital camera, a spectrographic sensor, a hyperspectral sensor, an X-ray fluorescence (XRF) sensor, an ultraviolet (UV) fluorescence sensor, a laser-induced breakdown spectrometer (LIBS), gamma scintillation spectrometer, or thermal camera; and the method further comprises determining a travel path for the second sensor set used in the second sensor scan.

In some or all examples, setting the at least one adjustable operating parameter comprises at least one of: initializing at least one of the one or more sensors; physically or virtually orienting, focusing or tuning the at least one of the sensors; and setting a filter, color, wavelength, exposure time, aperture setting, or frequency range of the at least one of the sensors.

In some or all examples, setting the at least one adjustable operating parameter comprises: causing the sensor to collect data associated with a known reference sample; and setting one or more of the adjustable operating parameters to optimize desired data collection characteristics of the sensor.

In some or all examples, the method comprises a plurality of sensors operable in accordance with respective adjustable operating parameters, wherein setting the at least one adjustable operating parameter for at least two sensors comprises adjusting the sensors such that the sensors are configured to capture data from a commonly-defined spatial region.

In some or all examples, a relative orientation of at least one of the plurality of sensors with respect to a sample support is configurable by the controller in at least one degree of freedom, and the method comprises, in accordance with signals received by the controller from the same or another operator input device, changing a configuration of the at least one of the plurality of sensors relative to the sample support in at the least one degree of freedom.

In some or all examples, the first and second geological attribute data sets are associated with at least partially distinct portions of the geological core sample, and the same or another controller causes the data to be geospatially correlated using mathematical covariance techniques.

In some or all examples, the first and second geological attribute data sets are associated with at least partially distinct portions of the geological core sample, and the same or another controller causes the data to be geospatially correlated using spatial and spectral decomposition techniques.

In some or all examples, the first and second geological attribute data sets are associated with at least partially distinct portions of the geological core sample, and the same or another controller causes the data to be geospatially correlated using tags physically associated with known positions relative to the geological core sample.

In some or all examples, the method further comprises: filtering some or all of the captured data to generate enhanced attribute data sets representing optimized interpretations of attributes associated with portions of the geological core sample.

In some or all examples, the method further comprises: generating data representing a map of the identified one or more substances in at least one geological feature associated with the first and second geographical locations based at least partly on analysis of geological attributes represented by the first and second geological data sets.

In some or all examples, the method further comprises: determining or predicting a location of the identified one or more substances in the at least one geological feature associated with the first and second geographical locations based at least partly on analysis of geological attributes represented by the first and second geological data sets.

In some or all examples, the method further comprises: generating a map of the identified one or more substances in at least one geological feature associated with the first and second geographical locations based at least partly on analysis of geological attributes represented by the first and second geological data sets.

In accordance with a further embodiment of the present disclosure, there is provided a geological analysis system, comprising: a plurality of sensors each configured to capture data representing one or more physical attributes of a geological core sample, at least at one of the sensors in plurality of sensors is operable in accordance with a plurality of adjustable operating parameters; a controller; and a memory coupled to the controller, the memory storing executable instructions that, in response to execution by the controller, cause the controller to perform the methods described above and herein.

In some or all examples, the geological analysis system comprises: one or more frames to support a plurality of sensor mounts, each sensor mount independently configurable in at least one degree of freedom and adapted to support at least one of the plurality of sensors; and a sample support component configured to support at least one geological core sample; wherein at least one of the frames and the sample support component is spatially orientable with respect to the other, in accordance with signals generated by the at least one controller.

In some or all examples, the frames comprise a mobile chassis.

In some or all examples, the mobile chassis is towable.

In some or all examples, the mobile chassis is self-propelled.

In accordance with a further aspect of the present disclosure, there is provided a computing device comprising one or more processors and a memory. The memory having tangibly stored thereon executable instructions for execution by the one or more processors. The executable instructions, in response to execution by the one or more processors, cause the computing device to perform at least parts of the methods described above and herein.

In accordance with a further aspect of the present disclosure, there is provided a non-transitory machine-readable medium having tangibly stored thereon executable instructions for execution by one or more processors. The executable instructions, in response to execution by the one or more processors, cause the one or more processors to perform at least parts of the methods described above and herein.

Thus, in various aspects and environments the invention provides systems and processes for real-time or near-real-time analysis of individual geological scan/sensor results, which among other advantages enables acceleration of complete geological workflows, as well as the selective use of specific sensors re-scan of specific sample areas with different settings, based on initial scan results.

Additional advantages are provided through the provision of multi-sensor systems which enable improved alignment or correlation at the hardware level, as well as software improvements in co-location, geometric/geological correlation and upscaling of lower-resolution data sources using high-resolution data sources and various correlation algorithms.

Another aspect of improvement is a switch from per-pixel analysis to geospatial analysis which uses information from entire sample and geographical regions to consider shapes, forms, and patterns associated with various types of geological formations. In various embodiments this is combined with approaches that identify mineral and geological signatures of different materials to generate maps and classifications that better represent geological truth than current systems and approaches.

Among the many improvements offered by systems, devices, and methods in accordance with the invention are improvements in real-time or near-real-time analysis of individual scan/sensor results to allow for acceleration of complete geological workflows, as well as the selective use of specific sensors re-scan of specific sample areas with different settings, based on initial scan results.

In addition, the speed of analysis can be increased by providing systems according to the invention in mobile embodiments, by for example placing them on pallets of specially-adapted trucks or trailers, for transport to sites at or closer to the source of geological samples than is commonly possible through the use of existing systems.

These and other improvements and advantages are explained further in the disclosure below.

Other aspects and features of the present disclosure will become apparent to those of ordinary skill in the art upon review of the following description of specific implementations of the application in conjunction with the accompanying figures.

BRIEF DESCRIPTION OF THE DRAWINGS

Aspects and embodiments of the invention are illustrated in the accompanying drawings, which are meant to be exemplary and not limiting, and in which like references are intended to refer to like or corresponding parts.

FIGS. 11A and 11B are schematic diagrams illustrating examples of geological samples prepared for analysis by multi-sensor geological analysis systems in accordance with various aspects and embodiments of the invention.

DETAILED DESCRIPTION OF EXAMPLE EMBODIMENTS

Figure 1:
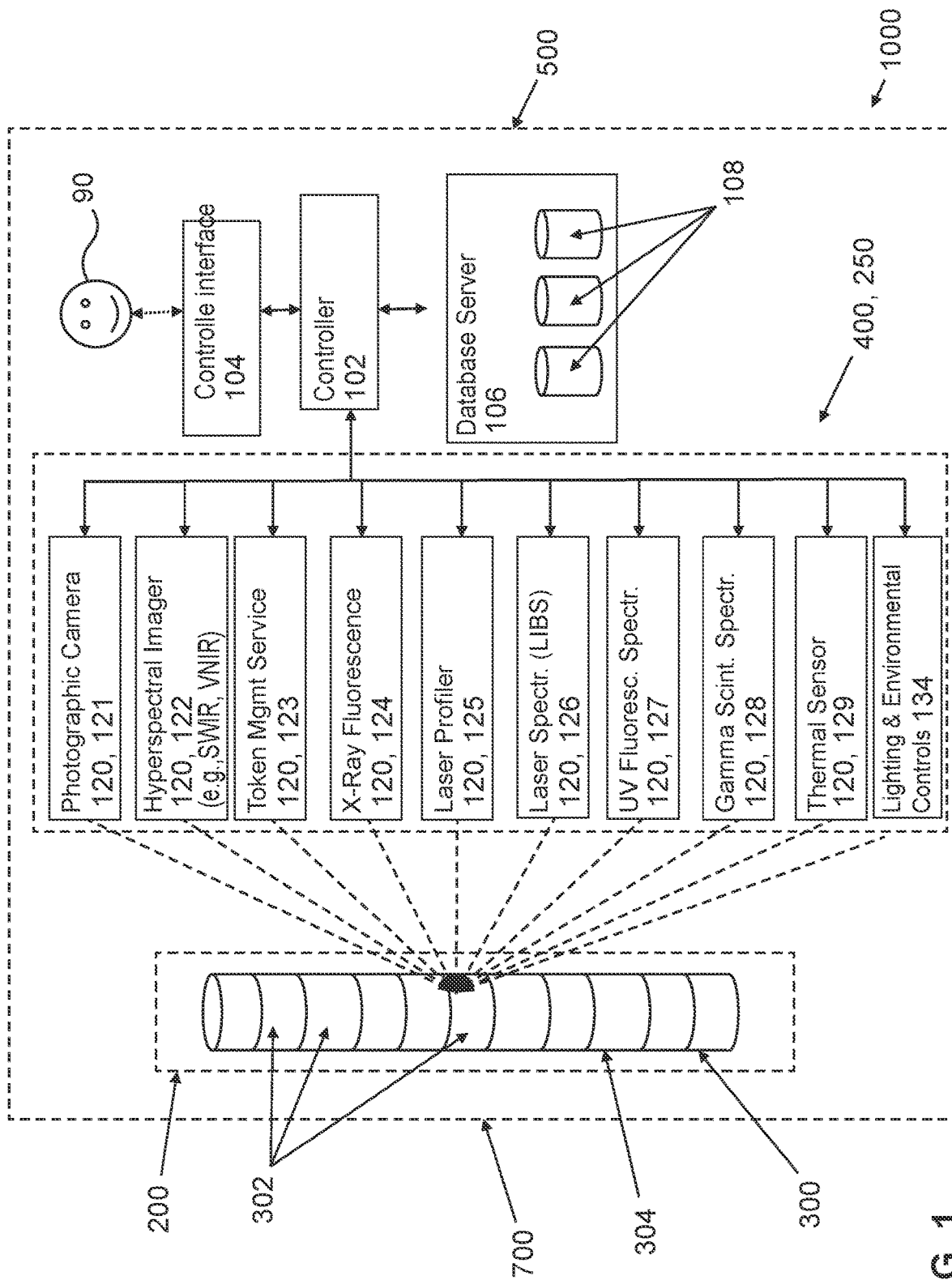
FIG. 1 is a schematic block diagram showing aspects of a multi-sensor geological analysis system in accordance with various aspects and embodiments of the invention.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

For the purpose of the present disclosure, the term "real-time" means that a computing operation or process is completed within a relatively short maximum duration, typically milliseconds or microseconds, fast enough to affect the environment in which the computing operation or process occurs, such as the inputs to a computing system. The term "dynamic" refers to a result dependent on the value of a set of one or more variables, wherein the result is or may be determined in real-time in response to detection of a trigger. Geometric terms such as parallel, perpendicular, straight and cylindrical are used in the present disclosure. It should be understood that some variants and tolerance are permitted within the context of these terms except wherein indicated otherwise either explicitly or inherently by context.

In various aspects and embodiments the invention provides systems, methods, devices, and computer programming products for improved analysis of geological samples, including for example drilling or other core samples, through the coordinated use of multiple sensors and types of sensors. Among other advantages, the invention offers significant advances in the accuracy, ease, and speed with which substances found in single samples, and/or across multiple samples, can be identified, mapped, and otherwise analyzed.

Various aspects of the invention, including various suitably-configured embodiments of systems, devices, methods, and programming products for improved analysis of geological samples, can be understood by reference to the drawings.

For example, FIG. 1 is a schematic block diagram showing aspects of a multi-sensor geological analysis system 1000 in accordance with various aspects and embodiments of the invention. In the embodiment shown, geological analysis system 1000 comprises a plurality of sensors 120, at least one controller 102 communicatively linked to each of the sensors 120, one or more controller interfaces 104 and selectively or otherwise controllably-persistent, machine-readable memory (ies) 108, and sample support component 200. In various embodiments, some or all of components 104, 102, 106, 108, 200, and 400 are supported by one or more frameworks 500 (FIG. 1), which can be mobilized by adaptation as a trailer or self-propelled unit such as a suitably configured truck or covered van. Optionally, some or all of components 102, 104, 106, 108 can be remotely located in a secure or other centralized location, and connected to further components 102, 104, 106, 108, 120, etc. using wireless communications devices.

Sensors 120 can be of any type(s) consistent with the purposes contemplated or suggested herein, and beneficially may (but need not) be of a wide variety of types. Such types can, for example, include any or all of cameras 121 configured to record visible or invisible electromagnetic radiation, such as red-green-blue (RGB) high-resolution digital or emulsion cameras; spectrographic sensors, including for example hyperspectral imagers 122; token monitoring and management devices 123; x-ray, ultraviolet (UV) or other fluorescence devices 124, 127; laser devices such as profilers or mapping devices 125, laser-induced breakdown spectrometers (LIBSs) 126; gamma scintillation spectrometers or other radiation sensors 128; and thermal radiation detection devices 129.

As will be appreciated by those skilled in the relevant arts, any of a very wide variety of sensors are suitable for use in implementing the various aspects, embodiments, and purposes disclosed herein. Many such sensors are currently available commercially, and doubtless others will be developed subsequent to filing of this application. Non-limiting examples include the following:

Devices 121 making use of high-resolution and/or other photographic techniques and devices (e.g., red-green-blue or RGB cameras) can be used to capture optical images, optionally in color or black and white, of samples, at any desired resolutions and corresponding to any desired areas of coverage. Like other sensors 120 suitable for use in implementing the various aspects of the invention, they can be of very high resolution. A wide variety of cameras 120, 121 suitable for implementing such sensors are available, as many are currently used across retail and industrial applications. There are multiple ways of acquiring suitable imagery, including for example correlation (sometimes herein referred to as "stitching") of data captured by two- or three-dimensional techniques, and/or through the use of line scanning cameras 121 that create images as relative motion is developed between the cameras and they are moved relative to relevant points or regions of the sample(s) 300, or as relevant portions of the sample(s) 300 are moved relative to the camera(s) 121's field(s) of view or capture field(s). In embodiments adapted for some applications, line scanning cameras can offer advantages such as the ability to generate images of arbitrarily elongated sections or regions of samples 300, which can for example match or approximate aspect ratios of cores or other long/continuous samples. In some embodiments, however, such advantages can be partially offset by vibration occurring during the relative camera/sample motion. In such cases, some embodiments of cameras 121 and other sensors 120 are configured to acquire series of overlapping regular images, or field captures, and correlate or "stitch" them together into a single very large photo or capture data set. Working with photos and other data capture sets at high resolution where pixel-level precision matters can require significant efforts for calibrating and image processing to correlate or correct focus, lens aberrations, etc.

Hyperspectral imaging refers to capture of light or other forms of electromagnetic radiation reflected at many individual wavelengths, optionally in selectively broad or narrow wavelength bands, across one or more portions of the electromagnetic spectrum, through the use of sensors 120, 122. Sensors 122 having wider or non-continuous wavelength intervals are sometimes referred to as multi-spectral sensors. Different sensor and lens materials can be used to capture hyperspectral data across different portions of desired spectrums. Examples of sensors 120, 122 useful in implementing various embodiments of the invention include those which operate in the short-wave infrared (SWIR) wavelengths, of approximately 900 to 2500 nm, which enables them to detect specific wavelengths absorbed by the resonance vibration of various molecular bonds, which can be used to identify materials present in a sample 300. Visible- and Near Infrared (VIS-NIR or VNIR) hyperspectral sensors 122 (approximately 400 to 900 nm) can measure color very accurately, and can similarly be used to identify various materials. Like cameras 121 and other sensors 120 suitable for use in implementing various embodiments of the invention, hyperspectral imaging sensors 122 can be implemented in the form of "pushbroom" line-scanning sensors configured to capture data when the sensors 120 and samples 300 are moved relative to one another.

X-Ray Fluorescence (XRF) sensors 120, 124 can be used to excite electrons of various substances comprised by samples 300 through the use of x-rays, and thereafter detect specific energies emitted by electrons returning to lower energy states after being displaced; which energies can be corresponded with known characteristics of various substances to identify element(s) and/or other substance(s) present in the samples. They can for example bombard any desired points or regions of samples 300 by use of an X-Ray emitter (XRF can refer to either or both of the emitter and detector, and is often used to refer to both an emitter and detector working together in a single sensor instrument 124). In some embodiments XRF instruments 124 comprise point sensors, but can be used to generate line or image data if relative motion between the sensor 124 and sample 300 is induced. This can for example require keeping an XRF head at a constant distance from the sample 300, using for example multiple axis actuators to move the sensor(s) and sample(s) relative to one another to maintain such constant distance. Some XRF devices are subject to interference from atmospheric gasses, which interference can be mitigated by enclosing the XRF sensor(s) 124 and sample(s) 300 within a vacuum, or by flooding an enclosed workspace with helium or other inert gas, by for example providing a sensor frame 400 that comprises a chamber enclosing both the XRF sensor(s) 124 and sample(s) 300, and optionally any further desired sensor(s) 120.

UV Fluorescence Spectrometers 127 can be employed in ways generally similar to those described for hyperspectral devices 122 above, by radiating sample 300 with ultraviolet (UV) light, and using hyperspectral sensors to capture the phenomenon of fluorescence to (higher) wavelength, and to correlate captured fluorescence with the presence of known or identifiable fluorescing materials, the presence and concentration of which can therefore be detected.

Laser Profilers 120, 125 can employ laser profilometry techniques to generate lines or grids useful in measuring depth(s) or contour profile(s) of sample(s) 300, for use in maintaining desired distances between sample(s) 300 and any or all sensor(s) 120. By inducing controlled, relative motion between a sample 300 and sensor 125 using tables or frames, sensor mounts, and motors or other actuators, a three dimensional (3D) profile of some or all of a surface of the sample 300 can be obtained. Such data can be used to directly measure structural properties or features (i.e. grain size, fractures) and can serve as an important source of meta-data for other sensors 120, such as for example identifying a focus distance and travel path for one or more other sensors, and/or for quality control work such as determining core/non-core qualities of portions of samples 300, identify cracks, surface damage, and/or other features of the samples. In some embodiments of processes for analyzing samples 300 in accordance with the invention, it can be advantageous to conduct laser profiling processes prior to using other sensors 120, as profiling can detect relevant issues or conditions associated with samples 300 that might affect performance of the other sensors 120.

Laser-based sensors can also be provided in the form of laser-induced breakdown spectrometers (LIBSs) to generate highly-focused and/or other high-energy laser beams, or pulses, to convert points or regions of samples 300 to plasma, and apply spectrometers and spectrographic techniques to analyze energies emitted by the plasma, in order to identify the elements within the plasma. As with other sensors 120, LIBS sensors 126 can be configured to generate line and/or regional image data through relative movement between the sensors 126 and analysis sample(s) 300, and optionally by capturing and correlating multiple image or data capture shots. Among the advantages offered by LIBS sensors 126 is the ability to generate significant amounts of data about elements present in a sample 300.

Gamma Scintillation Spectrometers 128 can be employed to detect natural radiation emitted by various elements (e.g., potassium, thorium, uranium, for example) which can be used to identify those elements and/or to correlated with the presence of various minerals in sample(s) 300. As with other sensors 120, gamma scintillation devices 128 can be provided in the form of point sensors and/or line sensors, or for example using point sensors operated as line scanners through induced motion between the sensor(s) 128 and cores or other samples 300. As one example, in some embodiments, gamma scintillation sensors 128 can be run along the length or depth of borehole (e.g., as in many oil and gas wells); comparing core and well gamma data can be used to 'depth corrected' core intervals to the correct position along the trajectory of a wellbore.

As previously noted, there exist a wide variety of other meta-data sensors 120 suitable for use in implementing systems 1000 and related processes in accordance with the disclosure. For example, laser profilers 125 and other meta-data sensors can be used to monitor samples 300 prior to scanning, e.g., for process and/or quality control purposes, including cameras 121 that capture video/images of various stages of an analysis process and thermal cameras 129 which can for example be used to check temperatures at the surface of samples 300, which temperatures can be used in various ways in identifying minerals, elements, and other substances, and making corresponding adjustments in operating parameters of various sensors 120. Cameras 121 can also for example be configured to interpret labels on sample boxes, sample trays, reference tags 350 (see e.g. FIG. 10) to communicate sample type, location, or other data, and/or to implicitly or expressly communicated necessary or desired handling or processing instructions; and can include video cameras configured to capture video and/or still images to document sample analysis processes 600 (FIG. 2, described below) for quality assurance and archival purposes, and or later reference in making follow-up analyses, as described below.

In various embodiments, wide varieties of different type(s) of sensors 120 can be provided, including any or all of the types described above; each type being provided in any desired numbers. For example, one or more of any or all of sensors 121, 122, 123, 124, 125, 126, 127, 128, 129, can be provided, and any or all of any such sensors types can be provided in multiple examples of identical form, or in multiple forms. For example, a plurality of optical cameras 121 can be provided, any two or more of them identical to one another and/or any others of varying types of specifications; likewise with all other types 122-129.

Each of sensors 120 can be configured to capture data representing one or more physical attributes of at least one common region (or portion) 302, of a geological sample 300. Such common region can be of any desired size, from a single point, for example the region corresponding to a single pixel of digital capture area, to the largest area that can be effectively covered by any desired pluralities of sensors.

Any or all of sensors 120 can be operable in accordance with any number(s) of adjustable or non-adjustable operating parameters, including for example focus, frequency or other types of tuning, shutter speeds and/or aperture settings, emission strength(s), etc. In some embodiments, some or all of such parameters associated with each or any of such sensors 120 are adjustable under the full or semi-automatic operation of controller(s) 102, and thereby indirect control of operator(s) 90 and interface(s) 104 as described herein. For example, any of sensor(s) 120 can be provided with sensor controls, which can be manipulated by human hand and/or by suitably-configured electronic control signals. Sensor controls adapted for use by humans and configured for use in conjunction with system(s) in accordance with the invention, such as those of RGB camera 120, 121, 131 shown in FIG. 7, can be adapted for use with system(s) 1000 through the use of suitably-configured frame(s) 250 and compatible servos and motors, controlled electronically through the use of control wires 851. In either case, controller(s) 102 can be actuated to accomplish desired adjustments or settings by means of control wires 851 adapted to carry suitably-configured control signals.

In various embodiments, controller(s) 102 can comprise any desired type(s) and/or number(s) of data and signal processors configured to accomplish the purposes disclosed herein, including for example any suitably-configured general- and/or special-purpose devices, which can for example range from handheld wireless telephone and special-purpose controllers, to laptop, tablet, desktop, and server-class devices. Controller(s) 102 can each be communicatively linked to one or more of sensor(s) 120, as for example by wireless, hard-wired, optical, sonic, or other means, in order to provide the sensor(s) with any desired operating instructions or instruction sets.

Controller(s) 102 can further be locally and/or remotely communicatively linked with controller interface(s) 104, such as graphical user interface(s) displayed by local, dedicated display devices, and/or wirelessly connected devices such as tablet computers or cell phones, by wired or wireless means, to accept operating commands from operator(s) 90 such as sample analysts.

Controller(s) 102 can further be locally and/or remotely communicatively linked with persistent machine-readable storage media, such as any type of computer-readable memory(ies), which can be provided in the form of local memory stores and/or remote databases, etc. to store both machine-executable instruction sets for execution by controller(s) 102 and raw and processed analysis data.

Interface(s) 104 can comprise any desired type(s) and/or number(s) of input/output and/or other control devices suitable for implementing the systems, devices, and/or processes disclosed herein, including for example any suitably-configured key boards, key pads, touch screens, display screens, speakers, microphones, voice recognition systems, etc., and any suitably-configured software, applications, firmware, or other signal generation means.

In some embodiments, system(s) 1000 can comprise one or more sample support components 200 such as tables, racks, or beds for supporting samples 300, such as core samples, during analysis processes. In some embodiments, such support components 200 are provided in the form of tables (or beds) 202, which can be controllably moved in any desired axial and/or rotational degrees of freedom, with respect to any or all of sensors 120, in order to establish any desired static or dynamic juxtaposition(s) between the sensors and samples 300. For example, a table 202 of a system 1000 such as that shown in FIGS. 4, 5 can be movable in any or all of axial directions x, y, z, and/or rotated about any or all of such axes, though the provision of suitably configured actuators such as step motors, servos, and hydraulic, pneumatic, and/or electro-mechanical actuators.

Alternatively, or in addition, any or all of sensor(s) 120 can be movably and controllably mounted on rack(s) or frame(s) 250, and moved in any desired axial or rotational degrees of freedom in order to define or refine any desired static or dynamic juxtapositions relative to sample(s) 300 or sample region(s) 302, through the use of electromechanical, hydraulic, pneumatic, and or other servos, motors or actuators in response to control signals generated by controller(s) 102 and/or controller interface(s) 104. When more than one frame 250 is present, the frames 250 may be referred as a framework.

Figure 2:
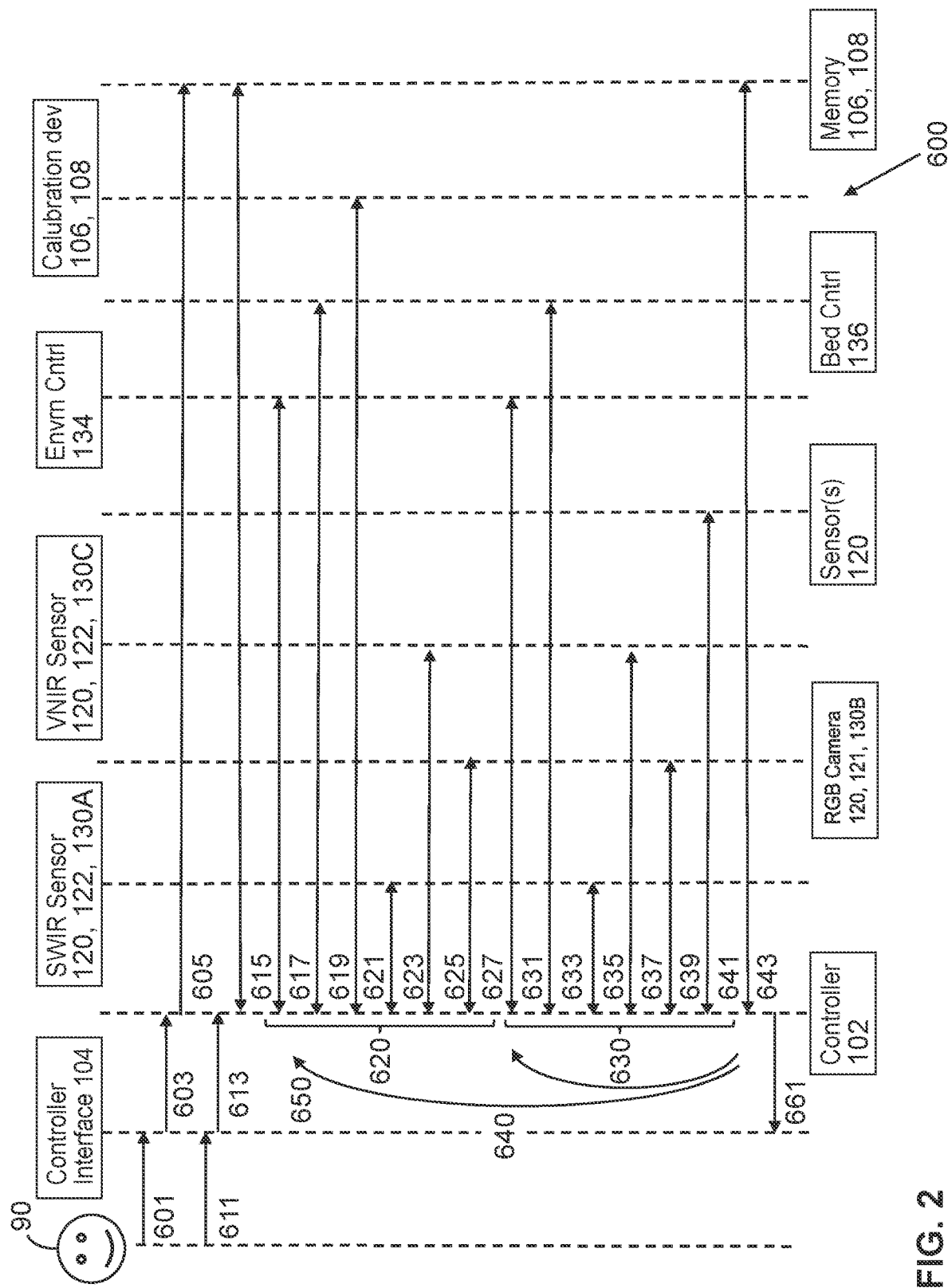
FIG. 2 is a schematic process flow diagram illustrating example signal exchanges between various components of a multi-sensor geological analysis system in accordance with various aspects and embodiments of the invention.

Further aspects of various embodiments of the invention may be understood by reference to FIGS. 1-3, and corresponding methods, structures, and components as shown for example in FIGS. 4-8.

For example, as shown at 601 in FIG. 2, a process 600 of setting up and executing a semi- or fully-automated geological analysis session can be started by an operator 90, which can be human or robotic, automated or otherwise, by accessing a controller interface 104 communicatively linked to a responsible controller 102 of a geological analysis system 1000, and using one or more keyboards, keypads, touchscreens and/or other input/output components of the controller and/or interface to generate signals representing a selection of some or all of a plurality of sensors 120 of the system 1000 to be used in setting up desired data-capturing conditions, and capturing data representing one or more physical attributes of one or more portions of one or more geological samples 300, such selection(s) including at identification and configuration of least one sensor 120 operable in accordance with a plurality of adjustable operating parameters.

For example, at 601 a human analyst 90 can access a keypad, keyboard, touchpad, touchscreen, and/or other input device(s) 104 of a general- or special-purpose data processor 102, such as a dedicated laptop or tablet computer, to interact with one or more output display devices 104 of a processor 102, to generate a multi-sensor control instruction set, comprising signals representing a selection of a plurality of sensors 120 to be used in an analysis of one or more geological samples, and optionally other data such as one or more portions of one or more samples 300 to be analyzed by the selected sensors, and operation settings to be used by the sensors 120.

For example, to define, start, and control a new analysis session using a system 1000, an operator 90 can invoke a suitably-configured sample-analysis program or application, in the form of a set of machine-interpretable and -executable instructions stored in persistent memory(ies) 108 associated with a controller 102 by entering suitable commands via a special- or general purpose operating system associated with the controller 102, to initiate an analysis set-up and execution session 600. Such invocation can result, for example, in generation by controller 102 of an interface display signal set configured to cause a touchscreen or other display of the controller interface device 104 to display an interactive set-up and control interface 800, 802, such as the interface shown in FIGS. 3A and 3B.

In the embodiment shown in FIGS. 3A and 3B, control interface 802 comprises interactive control icon(s), menu(s) and/or other or virtual input devices 804, 806, 808 for setting a variety of operating parameters to be applied in an analysis of one or more geological or other samples 300 during a given session, and for starting the analysis session, stopping the analysis session, storing data produced by the analysis session, and later in accessing, retrieving, and/or otherwise processing data related to the analysis session. Such an interface can, for example, include logical constructions such as interactive command menu items 804, 806, 808 for controlling various aspects of an analysis process.

Figure 3A:
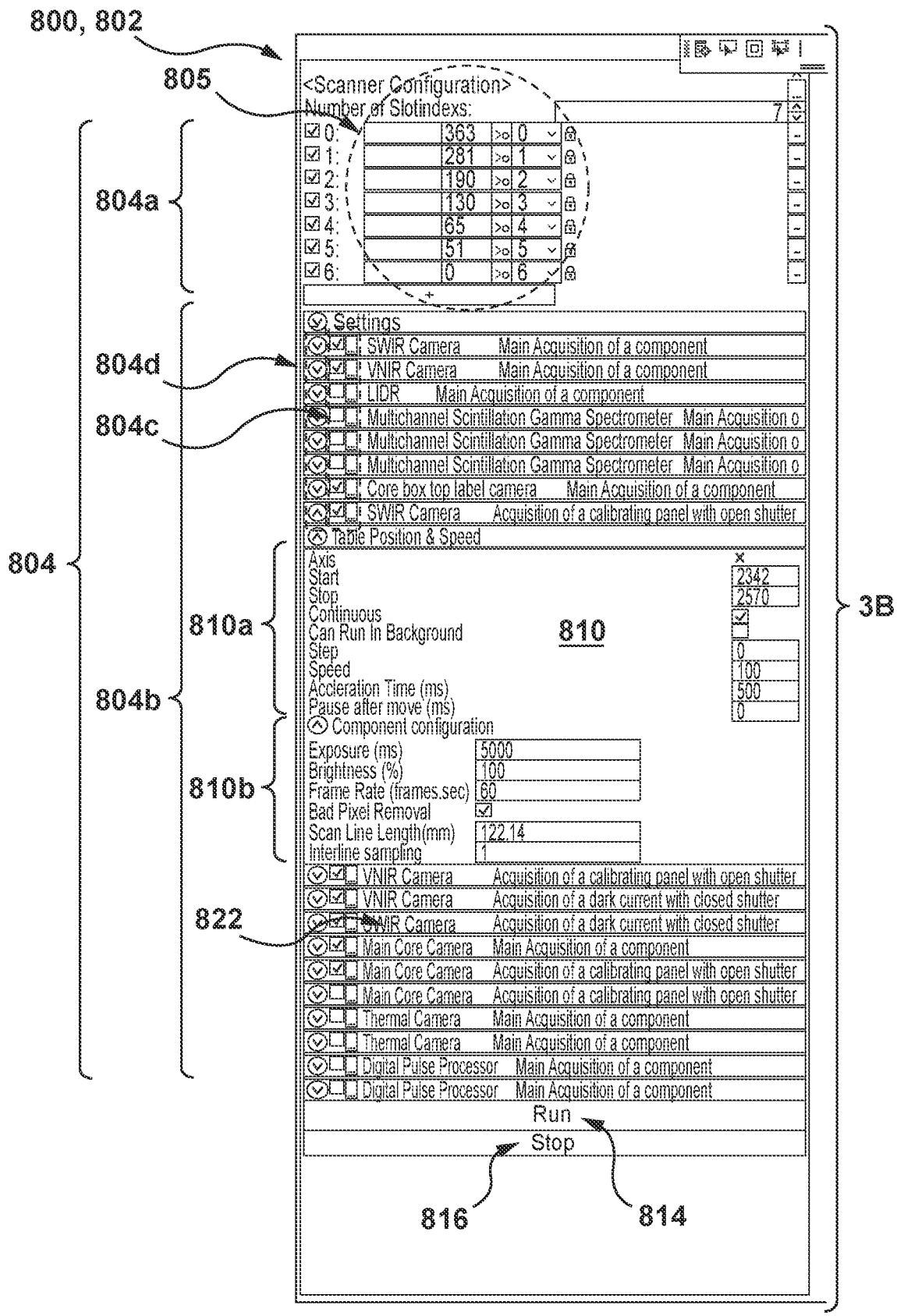
FIGS. 3A and 3B is a schematic diagram illustrating an example of an interactive operator screen suitable for display on a system controller in order to enable set-up and control of a multi-sensor geological analysis system in accordance with various aspects and embodiments of the invention.
Figure 3B:
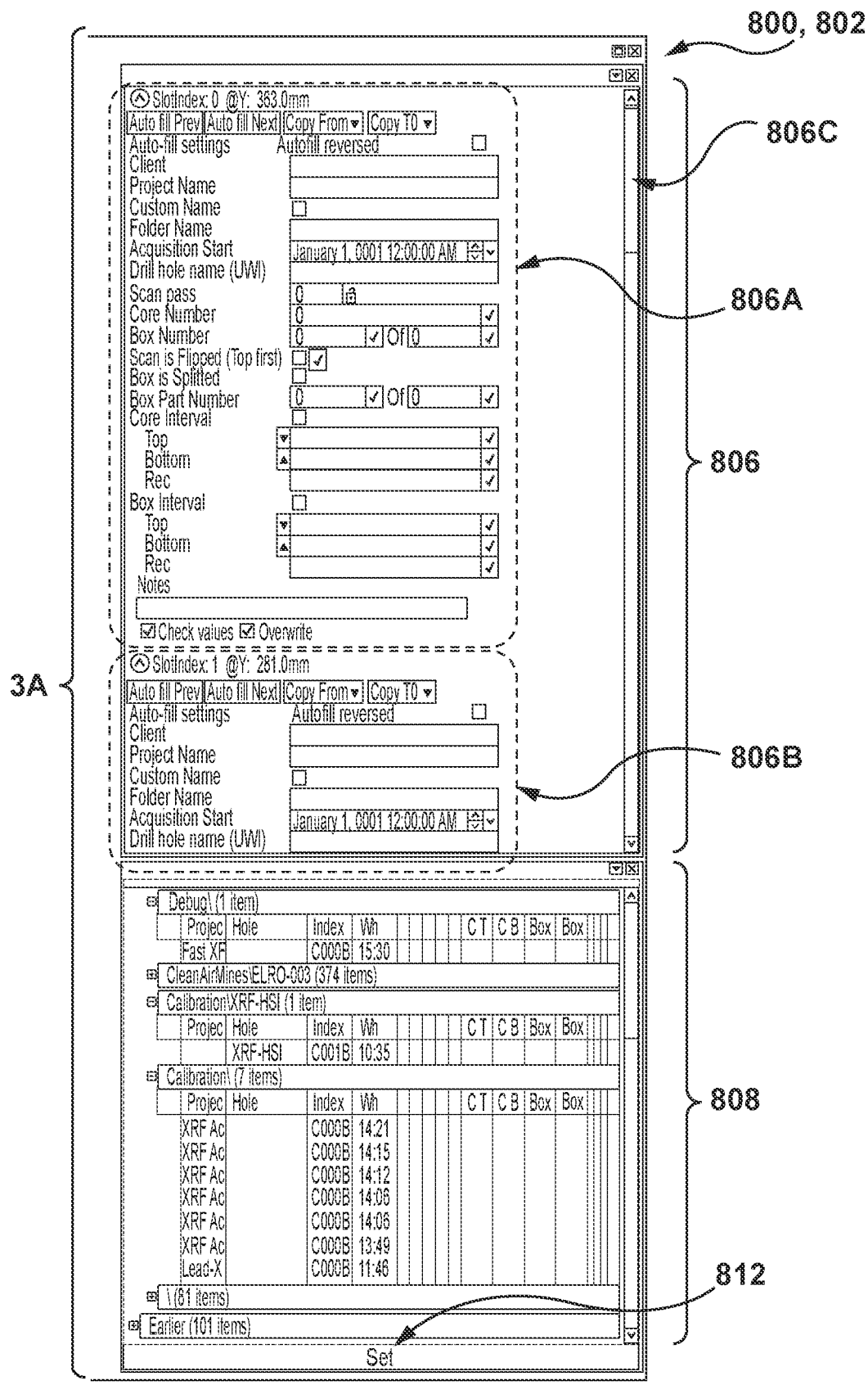

For example, using a control interface 802 of the type shown in FIGS. 3A and 3B in conjunction with an analysis system 1000 mounted on a mobile or stationary frame(s) 250 such as that shown in FIGS. 4-7, a user can start by defining and selecting one or more regions, in some embodiments referred to as "slotindexes," of one or more sample support tables, beds, or other support component 200, and therefore indirectly associated with regions 302 of samples 300 to be analyzed. For example, as may be seen by reference to FIG. 4, one or more of any or all of components 102, 104, 106, 108, 120, of an analysis system 1000 can be mounted on a mobile or stationary frame(s) 250, along with a stationary or moveable table 202 or other sample support component 200 (e.g., FIGS. 4-7); and sample support component 200 can be adapted to support one or more samples 300 in one or more desired juxtapositions with respect to such sensors. In the example shown in FIGS. 4 and 5, sample support component 200 comprises a table 202 mounted on hydraulic, pneumatic, electro-mechanical, or other actuators and adapted for controllable motion, under the control of controller 102, in or about any of axes x, y, z shown in FIG. 4 (i.e., all six Cartesian degrees of freedom), in order to place one or more samples 300 in any desired juxtapositions, static or dynamic, with respect to any one or more of sensors 120.

The table 202 can be physically and/or logically divided into any desired number of regions, in some embodiments dubbed 'slotindexes', and by use of interactive menu device(s) 804a, including corresponding individual checkboxes "0"-"6" as shown, any one or more such slotindexes can be selected for inclusion in any one or more analysis sessions. Selected slotindexes can be defined by use of input fields 805 and suitably-configured keypad(s), keyboard(s), touchscreen(s), and or pointing device(s); and or they can be pre-set and optionally modifiable by operator 90 through interface component(s) 104.

Figure 4:
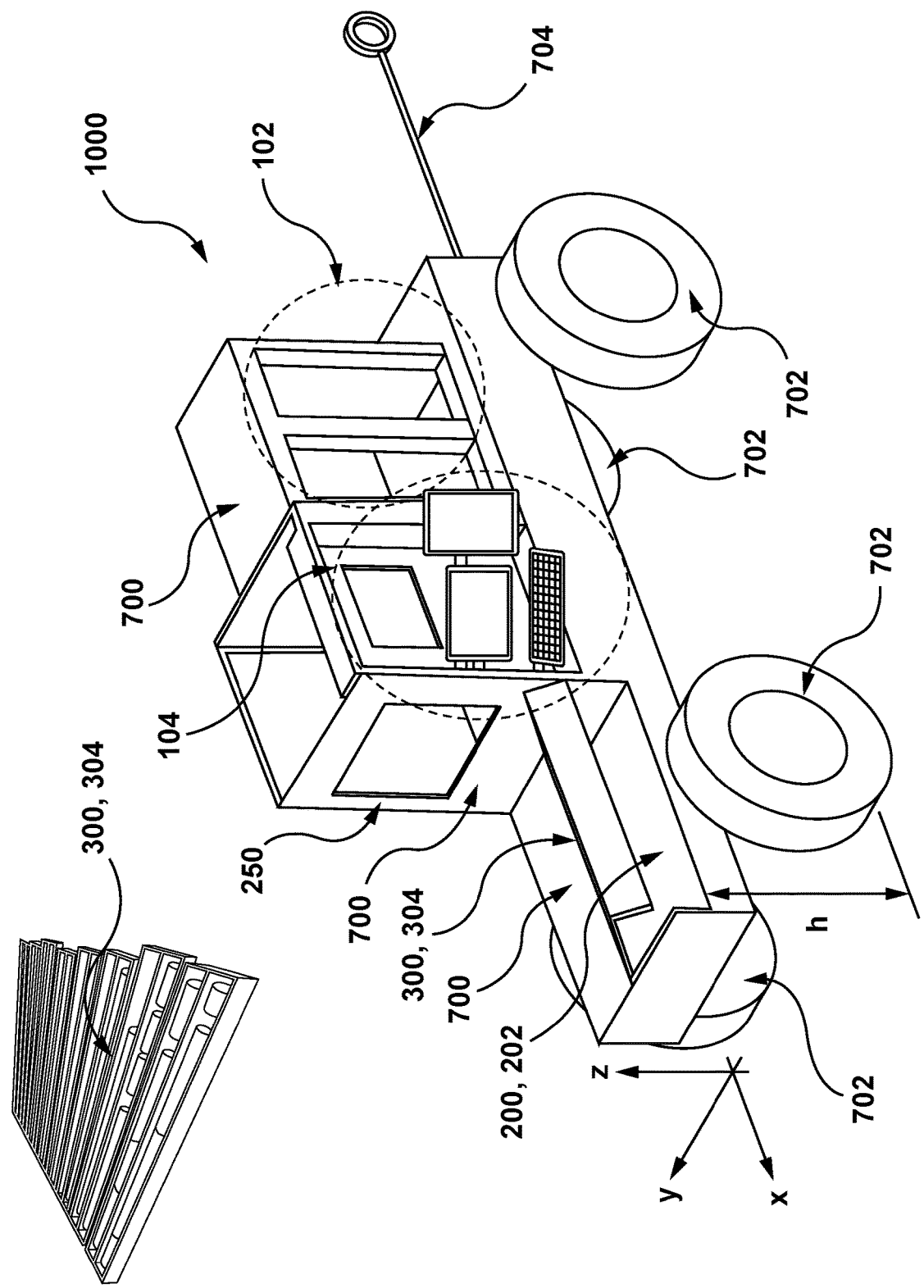
FIGS. 4-8 are schematic perspective diagrams showing aspects of components for multi-sensor geological analysis systems and tools in accordance with various aspects and embodiments of the invention.
Figure 5:
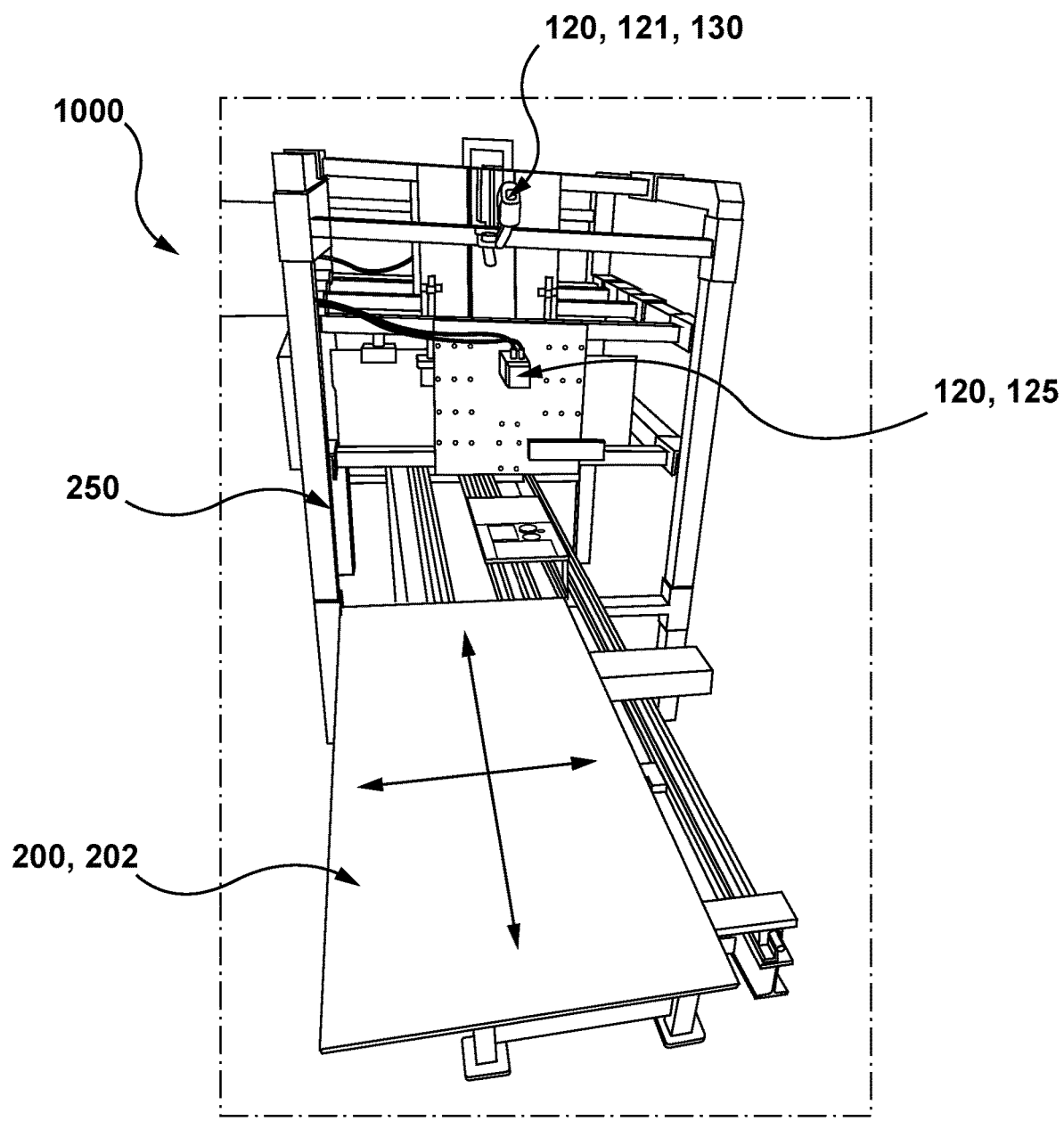

As one example, in a system 1000 suitable for use in analysis of drill core samples 300, 304 as shown in FIG. 4, comprising a table 202, samples 300, 304 can be placed on a table 202 in alignment with an 'x' axis of the table 202, and the table 202 can be logically and/or physically divided into elongated slotindex regions corresponding to individual core samples 304, using for example input fields 805 of interactive input menu 802. In addition, individual core sample slotindexes can further be divided lengthwise into smaller axial regions 302 (also or alternatively referred to as slotindexes), as shown in FIG. 1, which regions 302 can be of any desired dimensions in one, two, or three Cartesian dimensions x, y, z.

With desired regions of samples 300 and/or sample support component 200 defined and selected for inclusion in all or any desired portions of an analysis session, continuing at 601 in FIG. 2 an operator 90 can select and configure any one or more sensors 120 and/or environmental controls 134 for use in analysis or some or all of the slotindexes designated at 804a at one or more points during the session. For example, an interface menu 804b can be provided, listing some or all of sensors 120, 102, 121, 122, 123, 124, 125, 126, 127, 128, 129, 134, etc. and/or a controllably movable sample support table 202 currently available in the system 1000 can be presented, and operator 90 can designate them for use in the analysis session by selecting corresponding interactive check boxes 804c.

Any or all operating parameters associated with individual components 120, 200 listed in block 804b can be configured for use in all or any portion(s) of any numbers of analysis sessions by selecting corresponding menu-expansion device(s) (e.g., caret device(s), hyperlink(s), or other GUI device(s)) 804d as shown. For example, selection of caret device 804d associated with an SWIR camera 120, 122, can cause the controller 102 to generate and display an interface 800, 802 comprising a menu 810 comprising sections 810a and 810b, etc. Menu portion 810a can, for example, be used to designate portions of a sample table 202 to be scanned by a sensor 120, 122, and the speed and/or acceleration of table 202, timing of data capture, and other conditions under which the scanning is to be conducted; while menu portion 810b can be used to set exposure, brightness, frame rates, scan-line lengths, and other operating parameters of the sensor 120 associated with the menu.

As will be appreciated by those skilled in the relevant arts, operating parameters and conditions settable by means of menu(s) 810, 810a, 810b, and variations thereof, can be tailored in accordance with the nature and specific attributes of the sensor(s) 120 controlled thereby. For example, where a menu 810, 810a, 810b associated with camera 120, 121, 122, etc., might enable the operator 90 to set focus, exposure, brightness, and other parameters; a menu 810, 810a, 810b associated with a laser light detection and ranging (LIDAR) device or spectrometer might enable control of operating frequencies, output wattage, etc.

In addition, or alternatively, one or more logical interactive menu device(s) 806 can be generated, and used to generate identifying and other data to be associated with scanning of one or more slotindexes or other regions of a table during some or all portions of a session defined at 804, and stored in conjunction with data captured by the sensor(s) 120 during such session. At 806a, for example, such a menu input device can be accessed to enter and associated with a session capture data set information associated with a specific slotindex, or set of slotindexes. Such information can, for example, include identifier(s) associated with a specific client on whose behalf the analysis session is conducted, the time and date of the analysis, the location at which the sample was taken (for example, a specific drill hole), and specific core samples analyzed, along with specific portions of the sample ('core interval' or 'box interval') associated with the analysis, along with an operator notes. A plurality of such menu devices 806 can be presented, for example one associated with each slotindex, and by use of a scroll device 806c or other interface control mechanism an operator 90 can navigate to a desired menu and entre desired data. The ease and accuracy of data entry can be improved through the use of menu items "Auto fill prev," "Auto fill next," "copy from", "copy to", etc., to apply data from the current menu, a previous menu, or a stored menu to populate the various data fields, and optionally by overriding the pre-populated data with other data where necessary, thereby assuring that non-overridden data is consistent data already entered.

At 808, a navigable menu of previously-stored session control data sets can be presented. By accessing and either executing or optionally modifying and re-storing such previously stored sets, the efficiency and ease of conducting subsequent analyses may be improved, with any desired degree of consistency with previous analysis work. In addition, previously-defined calibration and other operations can easily be implemented and executed.

When an operator 90 is satisfied with input provided for control of an analysis session, at 611 (FIG. 2) the user can select an item 812 "set" to cause data input at menu 804, 806, etc., to be routed from the interface to memory/database 106, 108 and stored in persistent, machine-readable media, in a form that is thereafter identifiable and retrievable for example through use of a file navigation window 808 of a controller interface 800 of a controller 104, for review, reference, modification, and/or execution.

In the example shown in FIGS. 3A and 3B, an operator 90 has entered data suitable for causing a controller 102 to generate a multi-sensor control instruction set configured to cause an SWIR camera 120, 122; a VNIR camera 102, 122; LIDAR 120, 125; core box top label camera 102, 121, 130; and main core camera 102, 121, 131 of an analysis system 1000 to capture imaging, infrared, spectrographic, and other data associated with one or more samples 300 in one or more regions or slotindexes of a capture support table 202 in accordance with operating parameters and conditions specified using menu or window items 804; and optionally to be stored in a data base 106, 108 stored in association with identifiers and other information entered in window(s) or menu(s) 806. As may be seen in FIGS. 3A and 3B, the SWIR, VNIR, core box top and main core RGB cameras are all designated for multiple data scan operations during the specified session. Core box top RGB camera 120, 121 is designated for acquisition of data presented on a label or other device placed upon or otherwise associated with a box or other structure containing a core or other sample 300, as shown for example at 880 in FIGS. 9A and 9B; SWIR camera 120, 122 and VNIR camera 120, 122 are each designated for calibration, acquisition of dark current with closed shutter, and main acquisition operations, each with corresponding independent device parameter settings; and main core RGB camera 120, 121 is designated for calibration, and main acquisition operations, each with corresponding independent device parameter settings. Data controlling such operations is can be configured to cause each of the operations to be conducted independently, and sequentially, or in various combinations at the same time(s).

At 603, selection by such an operator 90 of a "set" command item 812 can cause a session identification and control data set (SID&CDS) to be generated by the controller 102 in accordance with the input received at windows or menus 804, 806, and at 605 to be stored in one or more designated memories 106, 108. Such an SID&CDS can, for example, consist of one or more data records comprising fields, strings, or other data structures representing at least some or all of the following:

```
<session index><session type><client/project>
<slotindex 1><sensor 1A ID&Ps> <sensor 1B ID&Ps> ... <sensor 1N ID&Ps>
<slotindex 2><sensor 2A ID&Ps><sensor 2B ID&Ps> ... <sensor 2N ID&Ps>
...
<slotindex N><sensor NA ID&Ps><sensor NB ID&Ps>...<sensor NN ID&Ps>
<post-processing instructions>
where:
    <session index> = unique serial number(s), name(s), or other identifier(s) associated with
            the analysis session
    <session type> = identifier(s) associated with type of session, e.g., calibration, cleaning,
            debug, sample data capture, etc.
    <client/project> = identifier(s) associated with the project, client, etc., with which the
            session is associated
      <slotindex 1> = serial number, x,y,z coordinates, and/or or other identifier(s)
                associated with a 1$^{st}$ region of the sample 300 / support
                component 200 to be scanned in running the session
         <sensor 1A ID&Ps> = identifier(s) and operations, conditions and parameters
                    to be associated with a 1$^{st}$ sensor to be used in capturing
                    sample data in the 1$^{st}$ region
         <sensor 1B ID&Ps> = identifier(s) and operations, conditions and parameters
                    to be associated with a 2$^{nd}$ sensor to be used in
                    capturing sample data in the 1$^{st}$ region
         ... <sensor 1N ID&Ps> = identifier(s) and operations, conditions and
                    parameters to be associated with an N$^{th}$ sensor to be
                    used in capturing sample data in the 1$^{st}$ region
      <slotindex 2> = serial number, x,y,z coordinates, and/or or other identifier(s)
                associated with a 2$^{nd}$ region of the sample 300 / support
                component 200 to be scanned in running the session
         <sensor 2A ID&Ps> = identifier(s) and operations, conditions and parameters
                    to be associated with a 1$^{st}$ sensor to be used in capturing
                    sample data in the 2$^{nd}$ region
         <sensor 2B ID&Ps> = identifier(s) and operations, conditions and parameters
                    to be associated with a 2$^{nd}$ sensor to be used in
                    capturing sample data in the 2$^{nd}$ region
         ... <sensor 2N ID&Ps> = identifier(s) and operations, conditions and
                    parameters to be associated with an N$^{th}$ sensor to be
                    used in capturing sample data in the 2$^{nd}$ region
      <slotindex N> = serial number, x,y,z coordinates, and/or or other identifier(s)
                associated with a N$^{th}$ region of the sample 300 / support
                component 200 to be scanned in running the session
         <sensor NA ID&Ps> = identifier(s) and operations, conditions and parameters
                    to be associated with a 1$^{st}$ sensor to be used in capturing
                    sample data in the N$^{th}$ region
         <sensor NB ID&Ps> = identifier(s) and operations, conditions and parameters
                    to be associated with a 2$^{nd}$ sensor to be used in
                    capturing sample data in the N$^{th}$ region
         ... <sensor NN ID&Ps> = identifier(s) and operations, conditions and
                    parameters to be associated with an N$^{th}$ sensor to be
                    used in capturing sample data in the N$^{th}$ region
```

```
<post-processing instructions> = command data configured to cause execution of any
    desired post-capture processing of data, including noise reduction,
    data compression, storage, etc.
```

As one example, it has been found that a good basic sensor suite for geological analyses adapted for use in scanning for presence, concentration, distribution, and identification of minerals in core samples comprises one or more of each of RGB image cameras 121, SWIR Hyperspectral sensors 122, and Laser Profilers 125. For many geological applications, use of one or more XRF devices 124 is also useful, as XRF sensors can be used to assess structures, along with the presence of various molecules and/or elements. For some applications the addition of Vis-NIR (Visual-Near Infrared) hyperspectral sensors 120 can also be also useful.

At any time, an operator 90 can access a previously-stored SID&CDS through the use of a controller interface 104 and database window 808 of FIGS. 3A and 3B, in order to review, modify, execute, copy, or delete it.

Alternatively, or in addition, when an operator 90 has entered all desired session control data, at 611 the operator can select a control item 814 "Run" to cause an analysis session to be conducted by the system 1000 in accordance with parameters specified in windows/menus 804, 806, etc. Selection of such a "run" command item 814 can for example cause a suitably-configured session execution command to be routed from the operator's controller interface 104 to the system controller 102.

Similarly, at any time after sending a "run" command, an operator 90 can cause an analysis session in progress to be stopped by selecting an command item 816 "stop" or "pause," resulting in a suitably-configured session termination or session suspension command being routed from the controller interface 104 to the controller 102, and from there to any sensor(s) and/or table controller(s) 130, 136 associated with the active analysis command data set.

For example, selection of a "run" command item 814 at 611 can cause the operator's controller interface 104, at 613, to route to the system controller 102 an analysis session execution data set comprising at least data representing the following items:

to cause the controller to read or otherwise access a previously-generated SID&CDS associated with the session index received at 611 and comprising slotindex and/or sensor data such as that indicated above and at 605 stored in persistent memory 106, 108.

Upon accessing and interpreting an identified SID&CDS at 615, at 620, 630, 640 a controller 102 can undertake any of a very wide variety of operations identified therein, for example through the use of various combinations of operation flags and/or sensor ID&Ps such as those described above. For example, at 615 the controller 102 can parse the SID&CDS to identify each of the sensor(s) 120 identified therein, and at least a first instruction associated with each sensor, and route such first instruction to each of the individual sensors. The controller can then route further instructions to each of the relevant sensors, until the desired analysis session has been fully executed.

Referring to the example shown in FIGS. 3A and 3B, for example, at 617 the controller 104 can route to any one or more environmental control systems/devices 134 suitably-configured instruction data sets, in order to establish any desired environmental conditions within one or more enclosures 700 (FIG. 4) enclosing some or all of core sample(s) 300 and/or sensor(s) and controller(s) 120, 130, 134, 102, 104, 106, etc. for scanning. Examples of conditions which can be set or otherwise controlled include lighting, ambient temperature, pressure, humidity, atmospheric content (e.g., nitrogen or other neutral or reactive gas or fluid), atmospheric radiation, etc., through the use of corresponding heaters, coolers, pumps, vacuums, lights, etc. and suitably configured environmental control data sets (ECDSs) comprising identifiers associated with desired environmental controls and corresponding thermostat, lighting condition, pressure, or other settings.

When any desired environmental conditions have been set at 617, at 619 in FIG. 2 controller(s) 104 controller 104 can route to any table, bed, or other sample support component

```
<session index><operation flag>
where
    <session index> = as described above, e.g., unique serial number(s), name(s),
    or other identifier(s) associated with the desired SID&CDS
    <operation flag> = identifier(s) corresponding to a desired operation to be performed by
        the system 1000, e.g..
        1 => run analysis session, as for example associated with a 'run'
            command icon 814
        2 => pause or suspend analysis session, as for example associated
            with a 'suspend analysis session' command
            icon (not shown), and
        3 => terminate analysis session, by for example writing all
            currently acquired sensor data to a database
            106, 106, and terminates execution of all
            remaining analysis functions
```

Upon receipt at 613 and interpretation of an analysis session execution data set comprising an operation flag or identifier corresponding to a command to execute a previously defined analysis session, and a session index associated with the corresponding SID &CDS, at 615 the controller 102 can execute a session data read instruction adapted controller(s) 136 and/or controllers associated with individual sensors 120, or groups of sensors 120, multi-sensor or other control data sets configured to place sensor(s) 120 and sample(s) 300 into desired juxtapositions with respect to one another, in order to accommodate either or both of calibration procedure(s) and data acquisition procedure(s).

For example when, as shown for example in FIGS. 3A and 3B, it is desired that any one or more sensors 120 be calibrated prior to acquiring data, at 619 controller 102 can instruct a controller 136 associated with one or more calibration devices to be moved into a desired juxtaposition with respect to one or more sensor(s) 120, for example through the use of suitably-configured data causing a table or other calibration device support controller 136 to move a calibration panel 850 comprising one or more calibration devices 852 (FIG. 8) into position for use by corresponding devices 120 in focusing, tuning, etc., in order to capture desired data from a sample 300.

Figure 6:
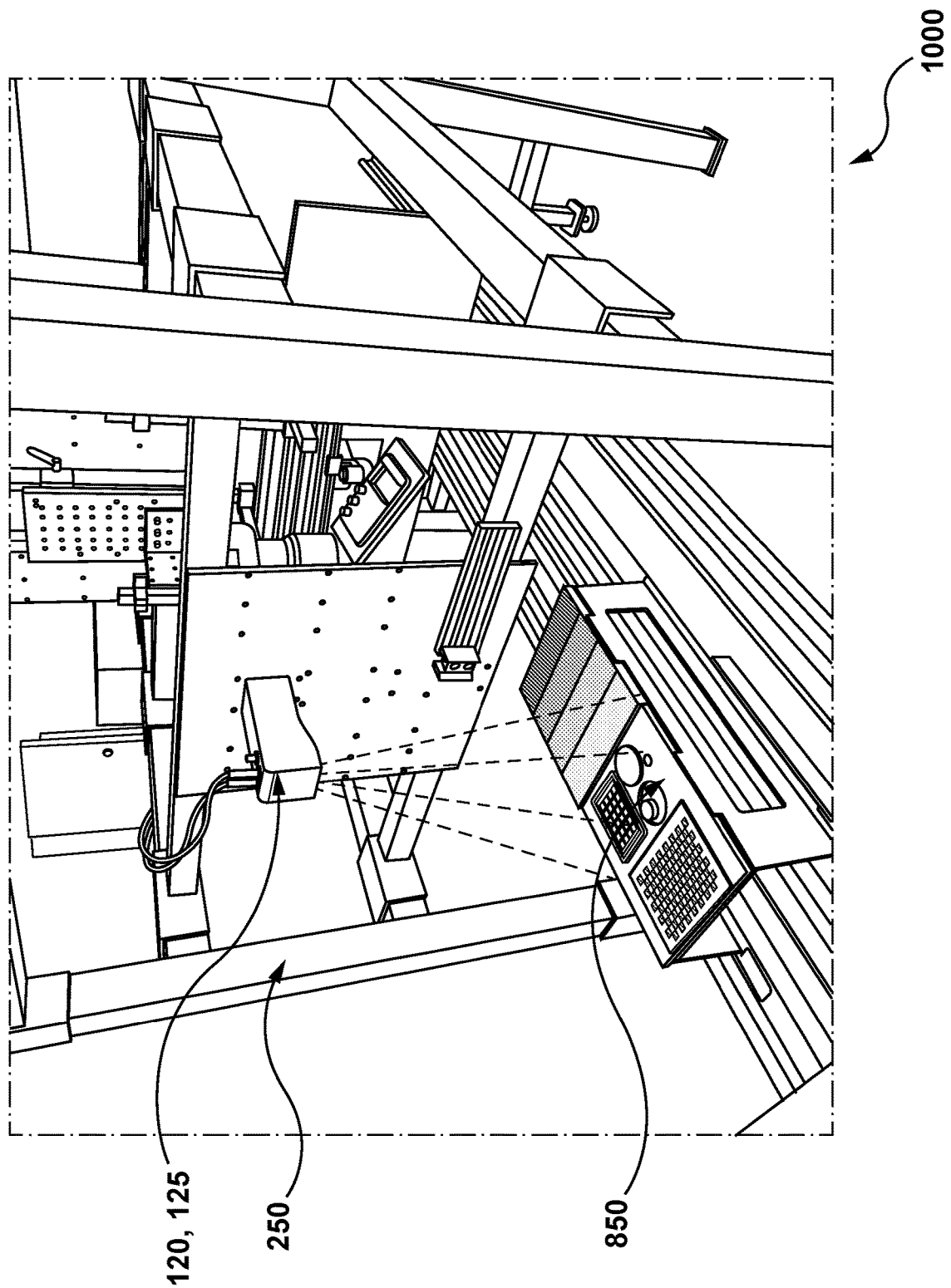
Figure 7:
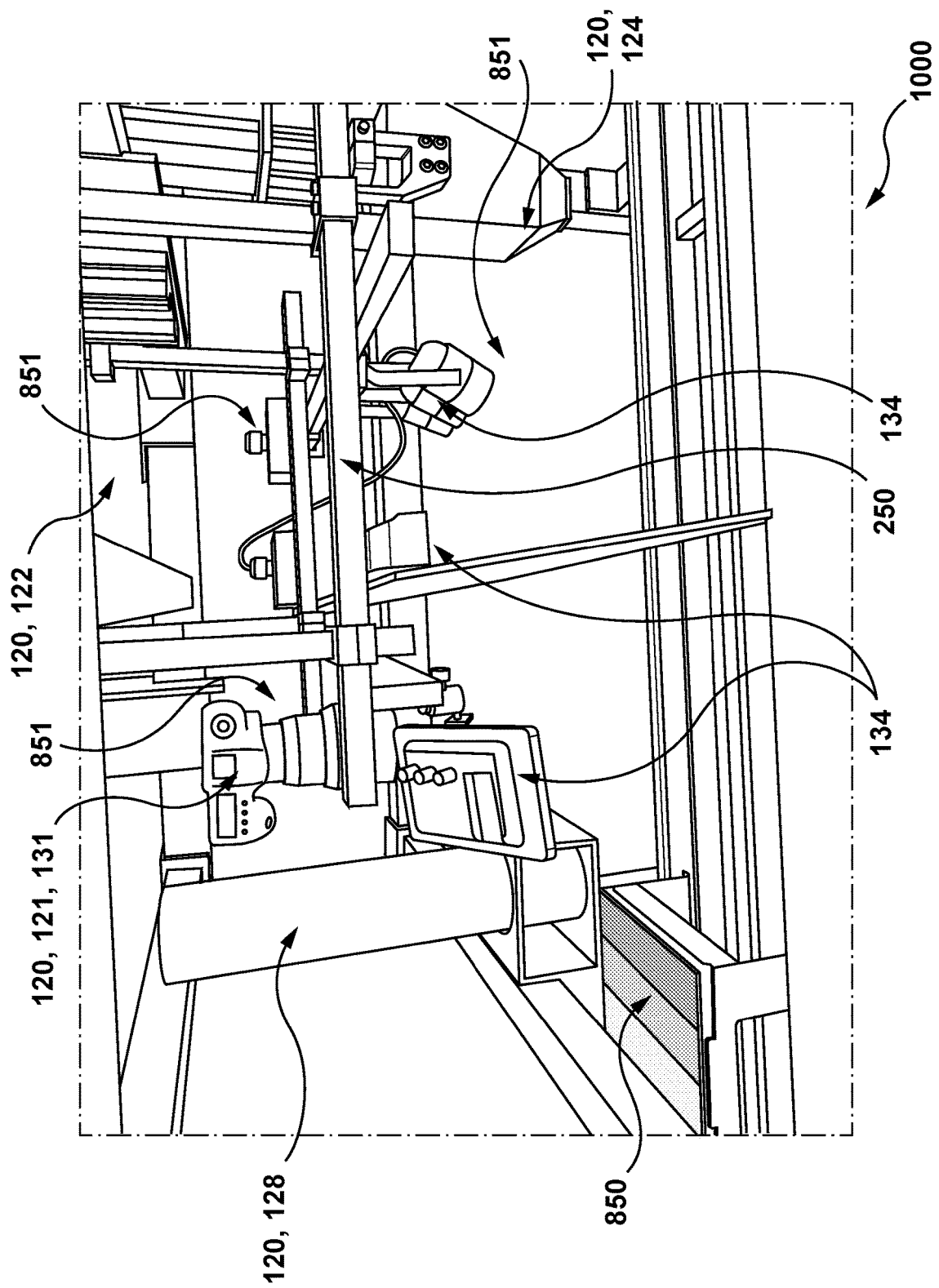
Figure 8:
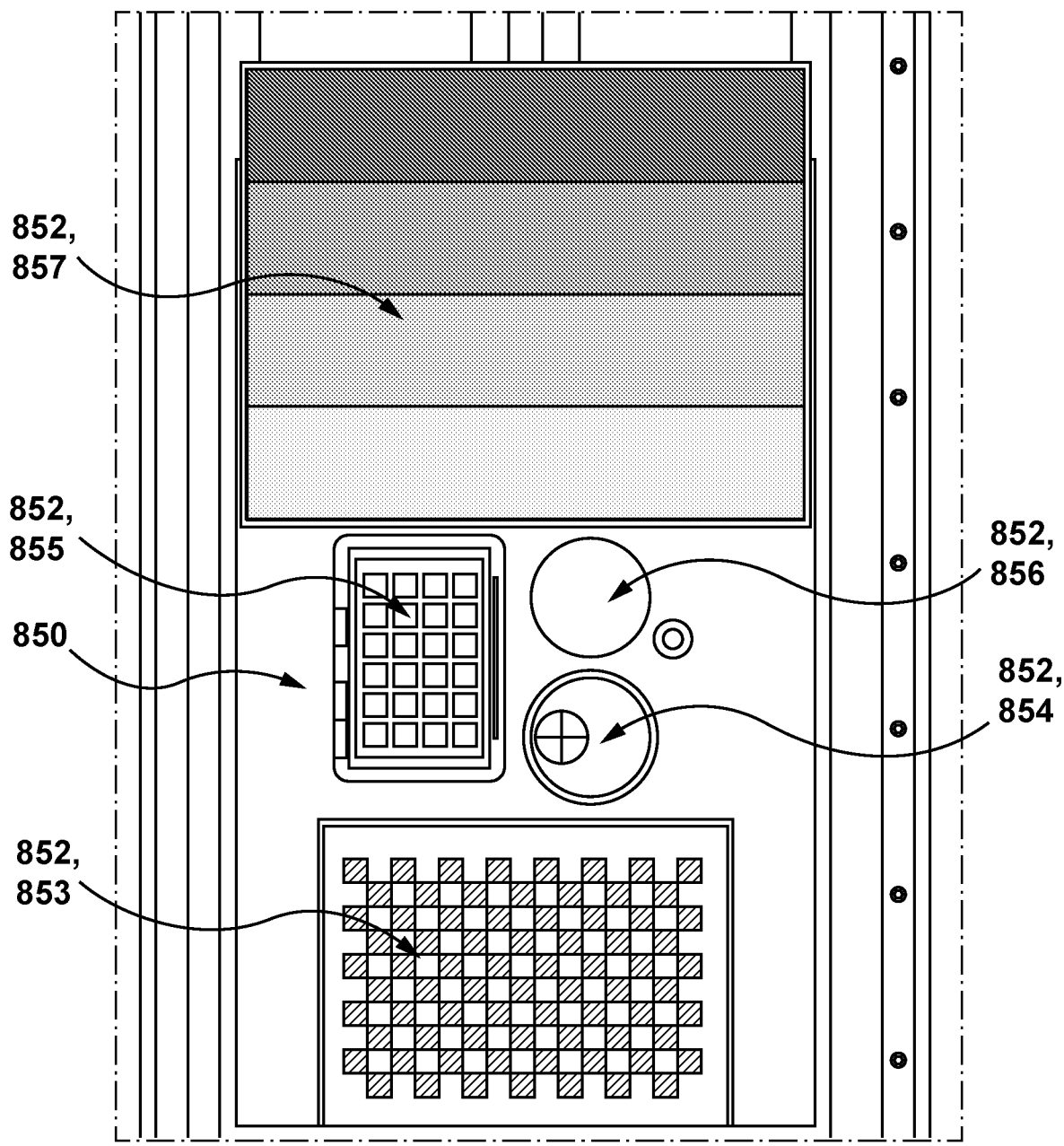

For example, with a calibration panel device 850 in a desired juxtaposition with respect to an SWIR 122, VNIR 122, and RGB camera 121, at 623, 625, 627 in FIG. 2 a controller 104 can route to each of the SWIR 122, VNIR 122, and RGB device 121, and table controller 136 instructions configured to cause the devices 122, 121 scan all or any portion(s) of one or more calibration panels 850 as shown in FIGS. 6-8. Such instructions can for example cause the controller 104 and/or any device controllers 130, 136, etc., operatively coupled to such sensors 120 to place the sensor(s) 120 in any suitable position(s) relative to the calibration panel, e.g., by moving the sample support table 202 into appropriate position(s); and to set any focus, tuning, and/or other operational patterns by sensing information associated with the control panels 850, by automatically or semi-automatically manipulating servos or other control devices associated with the sensors 120 by means of control lines or cables 851. In order to set operational parameters for such sensors 120, 130A-C, a calibration panel 850 can be placed on a sample support component 200 or other device, and automatically, semi-automatically, or manually moved into a desired slot index or other position relative to the sensor(s) 120 by for example a table controller 136, to enable the sensors to read calibration patterns and/or other data from the panel 850, by defining suitable slotindex parameters as described above. Alternatively, any or all of sensor(s) 120 can be positioned with respect to a calibration panel by use of hydraulic, mechanical, pneumatic, and/or other devices.

Data sets representing such instructions can, for example, be parsed by the controller 102 from the SID&CDS read by the controller at 615, and can comprise data records or items as described above, etc. For example, a record <sensor 1A ID&Ps> can comprise data representing identifiers for an SWIR sensor 122, and operating conditions and parameters configured to cause the SWIR sensor to acquire with an open shutter data representing SWIR data emanated by a calibrating device 85, 856 as shown in FIG. 8.

Calibration panel(s) 850 can comprise any desired number(s) and type(s) of calibration features or devices 852 to provide known reference samples, or standards, suitable for use in calibrating any operating parameters relevant to sensor(s) 120 comprised by the system 1000, and setting one or more of the adjustable operating parameters to optimize desired data collection characteristics of the sensor.

For example, as shown in FIG. 8, a calibration panel 850 can comprise one or more of each of a checker-board pattern device 853 which can be used to calibrate or correct focus, aspect ratio, optical aberration(s), and/or other properties for RGB or other photographic cameras 121 and/or laser spectrometers 126, etc.; device 854, which can comprise thermal output devices to calibrate infrared and other thermal sensors 122; device 855, which can provide colored sections or lights which will reflect or emit light at known wavelengths under known conditions for calibration of RGB cameras 120 etc.; device 856, which can emit radiation at desired wavelengths for calibration of UV fluorescence spectrometers 127, and gamma scintillation spectrometers 128; and any of a wide variety of greyscale, color, or other spectral standards 857, which can be used to calibrate any or all of the foregoing. Devices 854 having features of known 3-dimensional relief can be used to calibrate laser profilers 125.

As a further example, at 625 in FIG. 2 a controller 102 can route to a hyperspectral sensor 122 signals adapted to calibrate the device 122 in order to adjust a radiance-to-reflectance to a desired calibration setting. The hyperspectral sensor 122 can for example measure an absolute amount of light reflected at each point of a region 302 of a sample 300, at each of a plurality of desired wavelengths (i.e., the sensor can measure a radiance of the region). The measured radiance can be converted, for each desired wavelength or selection of wavelengths, to a percentage of light not absorbed by the sample (reflectance) by comparing to a calibration panel 857 of known spectral reflectance at each wavelength. Where sensors 120, 122 may be relatively unstable, such calibration processes can be repeated relatively frequently, e.g., before each scan involving such sensor(s). This can be especially useful where sensors are sensitive to environmental conditions with an enclosure 700 of a frame 250 for scanning are not optimal for the sensors 120, e.g., where sensor(s) 120 are subject to temperature or barometric pressure within the enclosure 700.

Among the advantages offered by systems 1000 in accordance with the invention is the use of calibration card(s) 850 and/or calibration device(s) 852 to set operating parameters of any or all of sensors 120 identified for use in capturing data in one or more steps of an analysis session, so that the sensors can be finely attuned, and/or re-attuned as an analysis progresses, to gather data associated with very fine common points or regions 302 of sample(s) 300. For example, sensors 120 in accordance with the invention can typically be calibrated to scan regions 302 of samples 300 as small as $1^{-6}$ m; and can be calibrated as small as $1^{-6}$ m, including for example a few square angstroms or a single grain of mineral, or a single pixel of a digital sensor component. With such finely coordinated operation of cameras, minerals and other substances, and patterns of dispersal of minerals and other substances, included in such samples can be very accurately plotted, and data across many points and many samples can be interpolated and extrapolated with greatly improved accuracy. In other words, the geological analysis system 1000 comprising a plurality of sensors operable in accordance with respective adjustable operating parameters and be configured such that the sensors are configured to capture data from a commonly-defined spatial region.

It is noted, for example, that traditional hyperspectral and other analyses focus on signals from each individual pixel (i.e., a single discrete analytical point) independently. This ignores the fact that geological features have certain shape properties (for example, deposits often occur in sedimentary layers; brecciation as a result of rolling rocks which are caught in formless deposits of other materials (i.e., blobs). Similarly, an analyst is unlikely to find a single pixel that has properties completely different from its neighbors, particularly when considered with respect to all neighboring directions. The analysis of geospatial regions of samples can help to reduce data noise and give more realistic results.

With any desired calibration process(es) 620, comprising for example steps 617, 619, 621, 623, 625, accomplished, at 630 a process of collecting data from sample(s) 300 can be initiated. For example, at 631, signals representing instructions configured to cause any desired changed or continuing environmental conditions, which can for example include lighting, ambient temperature, humidity, and any other conditions, to be set within enclosure(s) 700 can be routed by the controller 102 to appropriate environmental controller(s) 134 in order to create, maintain, or otherwise control a desired environment inside the enclosure(s) during an analysis session.

At 633, a sample support table or other support component 200 can be moved into a desired position relative to any desired sensor(s) 120, and at 635, 637, 639, 641 any desired combinations of sensors can be used to capture any desired information associated with the sample(s) 300.

For example, as shown at 822 in FIGS. 3A and 3B, at 635 a controller 102 can route to an SWIR sensor 120, 122 a sensor command data set (SCDS) interpreted as a part of the SID&CDS read at 615, causing the SWIR sensor 122 to conduct a scan of a region 302 of a sample 300 with a closed shutter, to capture data representing dark currents associated with the region 302. Operational parameters set for the SWIR sensor 122 can be reviewed and/or modified by accessing a logical menu structure 810 associated with the sensor by selecting the corresponding caret item 804*d* as shown. Optionally de-selection of the corresponding check box 804*c* can be used to remove this operational step by the sensor 122 prior to or during the analysis session. An example of an SCDS suitable for use in implementing this aspect of the invention is:

```
<sensor ID><set flag A><set flag B>...<set flag N>
<op flag A><op flag B>...<op flag N>
where
    <sensor ID> = unique identifier associated with desired sensor, e.g., local system
        address
    <set flag A> = instruction code for setting a first operating parameter for the
        identified sensor (e.g., shutter state, focus state, filter setting,
        exposure time, frequency, etc.)
    <set flag B> = instruction code for setting a second operating parameter for the
        identified sensor, e.g., as above
    ...
    <set flag N> = instruction code for setting an $N^{th}$ operating parameter for the
        identified sensor, e.g., as above
    <op flag A> = code representing $1^{st}$ operational instruction, e.g., open shutter
        or start laser, etc.
    <op flag B> = code representing $2^{nd}$ operational instruction, e.g., close shutter,
        power down laser, etc.
    ...
    <op flag N> = code representing $N^{th}$ operational instruction, e.g., secure
        device, etc.
```

At 637, 639, 641 in FIG. 2, further sensor command data sets can be routed to further sensor(s) 120, e.g. a controller 130C of a VNIR Sensor 122, a controller 130B of an RGB camera 121, and any other sensor(s) 120, to execute any further desired data capture operations associated with the currently-analyzed sample region 302.

When a first round of data capture by one or more sensors 120 is completed, at 630 control can return to a step 631 as defined above, in which one or more environmental parameters within an enclosure 700 can be confirmed or reset in accordance with data read by a controller 102 from the SID&CDS accessed by the controller at 615; at 633 any desired instructions for controller(s) 136 for adjusting the location of sample table 202 can be routed for execution; and at 635-641 any desired sensor(s) 120 can be caused to capture data in accordance with corresponding SCDSs, as defined by an operator 90 using a menu-driven or other interactive user interface 800 as shown for example in FIGS. 3A and 3B.

For multi-stage analyses, sensor data-capture session steps 630 (e.g., steps 631-641 described above) can be repeated, with the same or different sensor controllers 130A, 130B, etc., being instructed to conduct the same or different operations with the same or different sensor(s) 120, in conformance with data provided in relevant SCDSs of the SID&CDS read at 616, as described above, until all desired data associated with all desired sample(s) 300 and sample region(s) 302 has been captured and optionally stored in memory(ies) 106, 108.

When all desired sensor data-capture steps associated with any given calibration and environment settings defined at 620, for example through the use of steps 615, 617, 619, 621, 623, 625, 627 described have above have been executed, at 640, for example steps 615 through 643, a further sensor calibration and data capture session 630 involving the same and/or other sensors 620 and calibration processes 615-621 can be executed using suitably-configured control data sets as described above, by returning control by controller 102 at 650 to process step 615.

When the analysis session associated with the SID&CDS read at 615 and executed at 617-641 has been completed, at 643 any desired data captured during the session can be routed to persistent media for storage in memory(ies) 106, 108, for later analysis, reference, or other processing Thus, for example, in various aspects and embodiments the invention provides a geological analysis system 1000 comprising a plurality of sensors 120, each configured to capture data representing one or more physical attributes of at least one common region 302 of a geological sample 300 and at least at one of the plurality of sensors 120 is operable in accordance with a plurality of adjustable operating parameters; wherein at least one controller 102 is configured to execute machine-interpretable instruction sets, e.g., SID&CDSs and SCDSs, stored in memory(ies) 106, 108 and to cause the controller 102 to receive from at least one operator input device 104 one or more signals representing selection of some or all of the plurality of sensors 120 to capture data representing one or more physical attributes of at least one region 302 of a geological sample 300, the selection including the at least one sensor 120 operable in accordance with a plurality of adjustable operating parameters; in accordance with signals received by the controller 102 from the same or another operator input device 104, set one or more adjustable operating parameters of the at least one sensor 120 operable in accordance with a plurality of adjustable operating parameters; in accordance with instructions received from the at least one operator input device 104, cause the plurality of selected sensors 120 to capture data representing a plurality of physical attributes of the at least one region 302 of the geological sample 300; and cause some or all of the captured data to be stored in persistent machine-readable memory 106, 108.

Moreover, it may be seen such geological analysis systems 1000 can be configured, for example through the use of suitably-configured machine-interpretable SID&CDS instruction sets to cause at least one controller 102, in accordance instructions received at 611 from at least one operator input device 104 subsequent to causing the plurality of selected sensors 120 to capture data representing a plurality of physical attributes of the at least one region 302 of a geological sample 300, to cause the same or another one or more of the plurality of sensors 120 to capture additional data representing one or more of the same or other physical attributes of the at least one region 302 of the geological sample 300.

Similarly, it may be seen that in various aspects and embodiments the invention provides geological analysis systems 1000 configured to cause, in accordance with instructions received from at least one operator input device 104 to change at least one adjustable operating parameter of at least one of the plurality of sensors 120; and cause one or more sensors associated with changed operating parameters to capture additional data representing one or more of the same or other physical attributes of the at least one region 302 of a geological sample.

It may further be seen from the foregoing that in various aspects and embodiments the invention provides geological analysis systems 1000 comprising frame(s) 250 to support a plurality of sensor mounts 120, each sensor mount 120 independently configurable in at least one degree of freedom and adapted to support at least one of the plurality of sensors 120; and at least one sample support component 200 configured to support at least one geological sample 300; at least one of the frame(s) 250 and the sample support component 200 spatially orientable with respect to the other, in accordance with signals generated by at least one controller 102 in response to signals received from at least one operator input device 104. The frame(s) can be configured for static placement, e.g., in a laboratory or other work space, and/or they can be configured for mobile deployment, by for example providing the frame(s) 250 with a suitably-configured chassis and wheels 702, as shown for example in FIG. 4. In mobile embodiments, the framework 250 can be towable, e.g. configured as trailers, e.g. by provision of yokes, hitches, etc. 704 for attachment to motorized vehicles; or they can be provided with truck or other cabs, comprising engines, so that they are self-propelled. Alternatively, the framework 250 can be configured for lifting, as for example by a forklift, and placed securely on a flat bed of a trailer, truck, or other vehicle. In some embodiments, the frame(s) 250 are configured such that when they are placed on a workspace floor, vehicle bed, or other support, an upper surface of sample support component 200 or table 202 is a distance 'h' of about 24-48 inches off of the ground or other surface, and preferably about 28-36 inches from such surface, to accommodate safe and convenient placement of samples 300 on the tables 202 by one or more human operators 90.

As explained above, systems 1000 in accordance with various aspects of the invention offer the advantage of enabling the fully- or semi-automatic setting, and optionally resetting, of adjustable operating parameters for the various sensor(s) 120 for various portions of an analysis session, for example through the use of suitably-configured SID&CDSs and SCDSs. As one example, the invention enables calibration of such sensors 120, either for separate or coordinated use in analyzing various regions 302 of sample(s) 300. Such setting and resetting of operating parameters of sensor(s) 120, whether for single or combined use, can include, for example, any or all of initializing the sensor(s); physically or virtually orienting, focusing or tuning the sensor(s); and setting various filters or controls such as filtering or tuning for desired colors, wavelengths, frequencies, and ranges thereof.

Figure 9A:
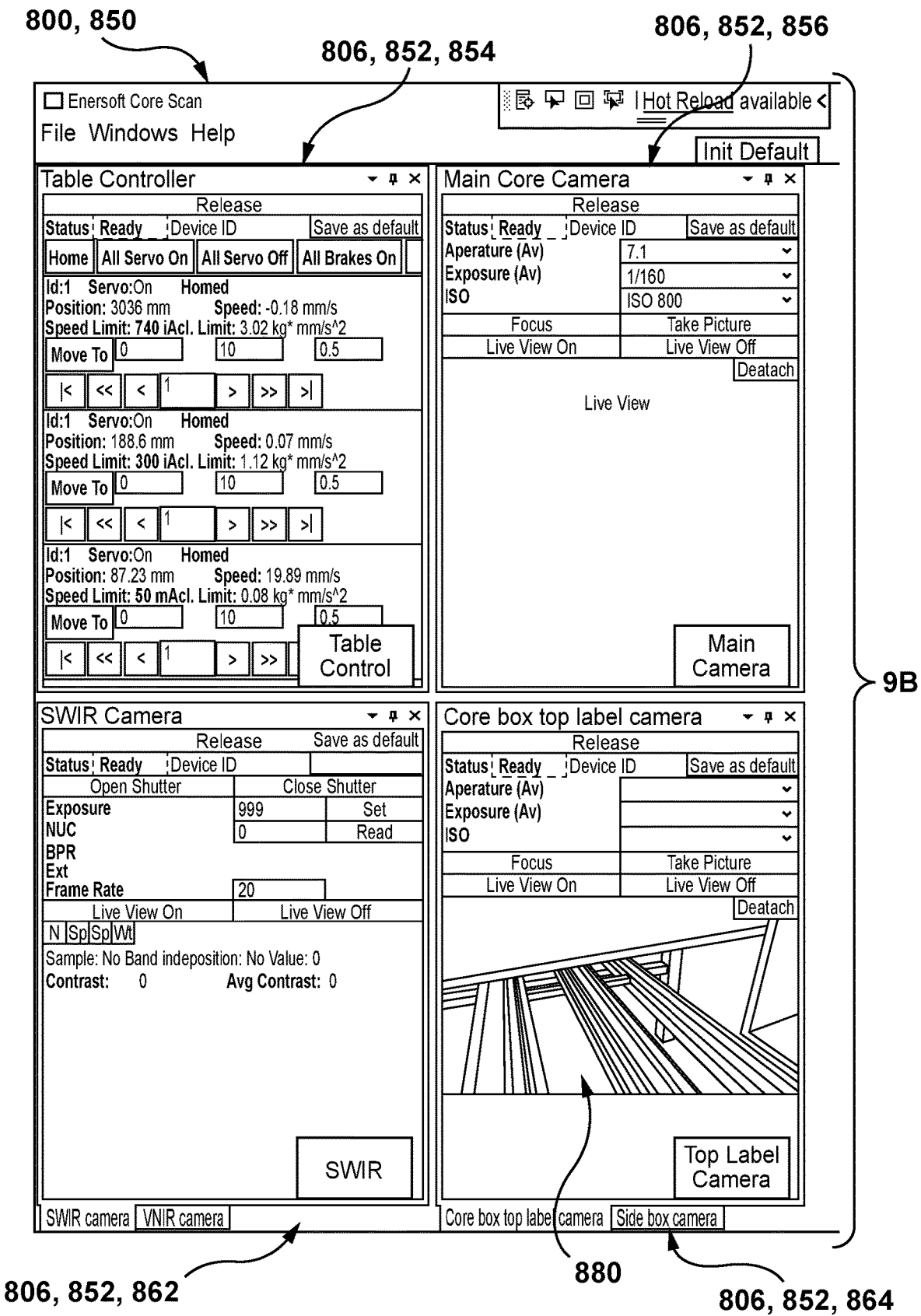
FIGS. 9A and 9B is a schematic diagram illustrating an example of an interactive operator screen suitable for display on a system controller in order to enable initialization and other set-up and control features of a multi-sensor geological analysis system in accordance with various aspects and embodiments of the invention.
Figure 9B:
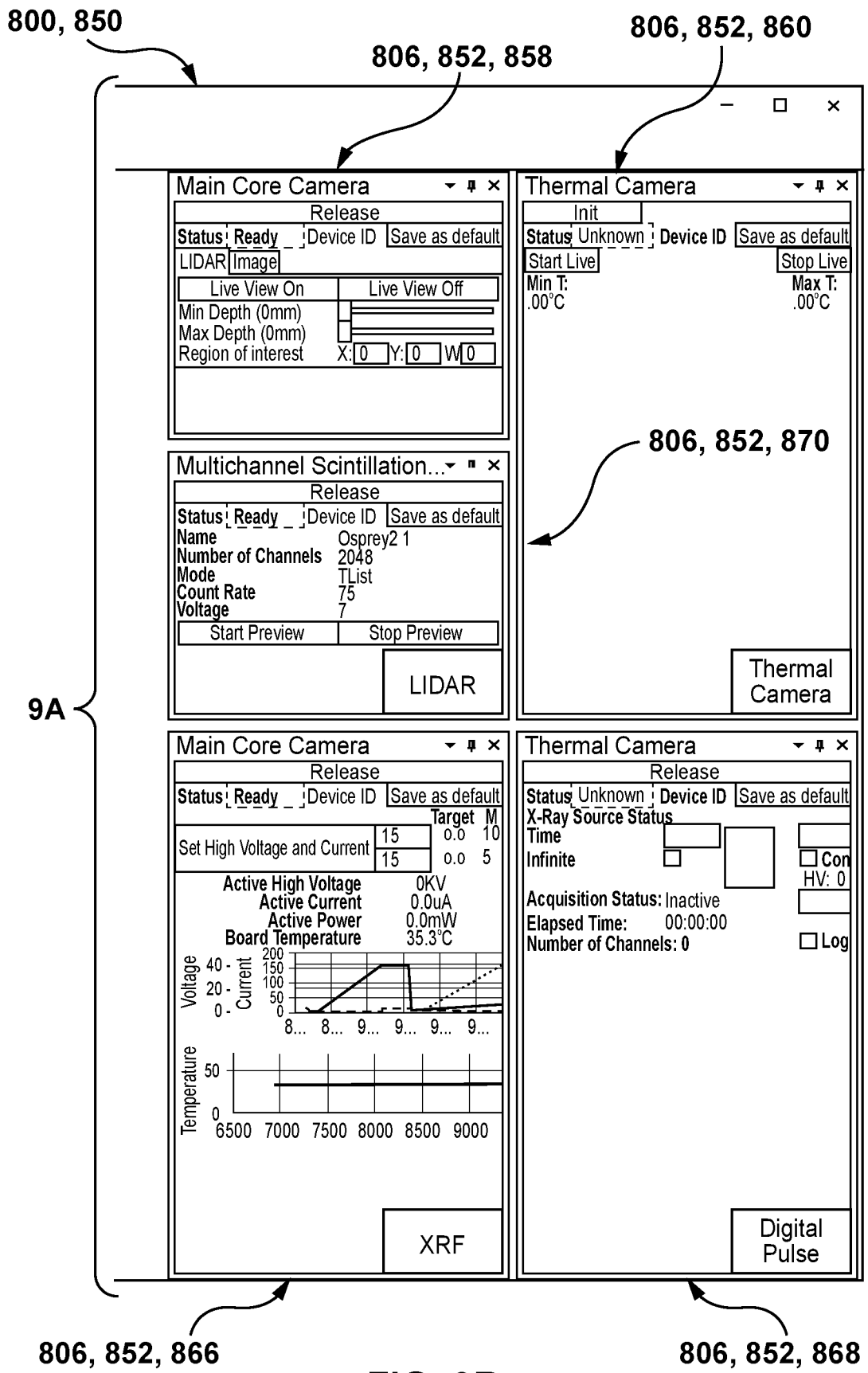

An example of an interactive input screen 800 comprising a plurality of logical interactive menu device(s) 806, 852 useful for initializing sensor(s) 120 and other support components 200/136 and 134, etc., is shown in FIGS. 9A and 9B. In the example shown, each interactive menu device 852 is associated with a corresponding sensor 120, namely a menu device 854 associated with a controller 136 for a table 202/support component 200; 856 for a main core camera device 121; 858 for a LIDAR 125; 860 for a thermal camera or sensor 129; 862 for a SWIR camera 122; 864 for a core box top label camera 121; 866 for an Xray fluorescence device 124; 868 for a digital pulse processor 120; and 870 for a Multichannel Scintillation Gamma Spectrometer 128. In each case, the associated menu device 852 enables an operator 90, using a user interface 104, to initialize or otherwise set any desired operating parameters associated with the device 120, 134, 136, etc., limited only by the capabilities of the respective devices. For example, as shown at 854, a table controller 136 and/or table 202 can be configured to initialize at any desired position within the range of its motion actuators, with respect to any corresponding x,y,z linear or rotational degrees of freedom; to translate between positions at any desired speeds, or within any desired speed restrictions; etc.

Camera menus 856, 864 can be used to configure RGB or other cameras in accordance with desired aperture settings, shutter speeds (exposure times), focus, etc.; and live views 880 as currently viewed with the corresponding applied settings can be provided, to help in position and focusing the camera, etc.

Among the advantages offered by the use of LIDAR and other light- and sound-based ranging devices 125 in conjunction with system(s) 1000 in accordance with the invention is the ability to map surfaces and contours of samples 300 and various regions thereof, so that for example any desired cameras, Xray, and other devices can be very precisely positioned and coordinated to focus or otherwise gather precisely calibrated data from specific points on such surfaces or contours. Such ranging devices can be configured through the use of menus 858 to control settings for minimum or maximum depth variances, three-space ranges and coordinates of regions 302 of interest, etc.

Menu(s) 870 associated with gamma spectrometry devices can be configured to enable control of numbers of channels available scanning modes and rates, etc, including output voltage and other power settings. Thermal camera(s) 129 can be controlled to set data capture ranges associated with temperatures, etc.

Operational parameters that can be set for SWIR camera(s) 122 through the use of menu(s) 862 can include, for example, shutter opening and closing, and exposure times, frame rates, etc.

Menu(s) 866 can be used to control parameters such as maximum and/or minimum voltages and currents, and to monitor temperatures, voltages, and other characteristics of Xray devices 124.

Xray and other devices can be paired with digital pulse processors 120, which can be configured through the use of menu item(s) 868 to identify sources of Xrays or other data to be captured, time windows, and other operating parameters.

Any or all of menus 852 can be configured to show operational status, e.g. ready, off, or unknown, of any desired devices 120, etc.

It will further be seen from the foregoing that in various aspects and embodiments the invention provides methods, including for example methods 600, for analyzing geological samples 300, such methods performed by one or more controllers 102 of multi-sensor geological analysis systems 1000 and comprising receiving from at least one operator input device 104 one or more signals representing a set or selection of some or all of a plurality of sensors 120 for collection of data representing one or more physical attributes of at least one common region 302 of a geological sample 300; in accordance with signals received by the controller(s) 102 from the same or other operator input device(s), generating one or more multi-sensor control instruction sets comprising data representing operating parameters of some or all of the selected sensor set, setting one or more adjustable operating parameters of at least one of the plurality of selected sensors 120; in accordance with instructions received from the at least one operator input device 104, causing the plurality of selected sensors 120 to capture a set of data representing a plurality of physical attributes of the at least one region 302 of the geological sample 300; and causing some or all of the captured geological attribute data set to be stored in persistent machine-readable memory 306, 308.

Such methods can further include other processes described above, including for example initializing some or all of sensors 120; setting physical and/or virtual orientations of sensors 120; focusing, tuning, setting aperture controls and/or adjusting output power levels of sensor(s) 120; applying filters, frequency ranges, and other limitations to data collection parameters; and calibrating some or all of sensors 120 through use of known reference samples, including setting adjustable operating parameters for pluralities of sensors 120, so that the sensors are configured to capture data from a commonly-defined spatial region.

In further embodiments, such methods can include, subsequent to causing a plurality of selected sensors 120 to capture a subsequent set of data representing a plurality of physical attributes of the at least one region 302 of a geological sample 300, causing the same or another plurality of sensors 120 to capture additional data representing one or more of the same or other physical attributes of the same or another region 302 of the geological sample 300, and store such geological attribute data sets in persistent machine-readable memory.

In further embodiments, such methods can include, subsequent to causing a plurality of selected sensors 120 to capture data representing a plurality of physical attributes of at least one region 302 of a geological sample 300, changing at least one adjustable operating parameter of at least one of the plurality of sensors 120; and causing the one or more of sensors 120 associated with changed operating parameters to capture additional data representing one or more of the same or other physical attributes of the at least one region 302 of the geological sample 300, and optionally to store such subsequent attribute data sets in persistent memory.

As a further example, a method 600 in accordance with FIG. 2 can include, at 601-605, selecting a suite of sensors 120 of a system 1000, and samples 300, 302 to be scanned based on available data (logs) and generic sample types retrieved from a database 106, 108, by means for example of a user interface 800, 808 as shown in FIGS. 3A and 3B. At 611-615 an operator 90 can use a controller interface 104 to initiate a process 620 of configuring and calibrating the system 1000 so that the relative positions of each sensor 120, sample area 302, and calibration parameters are precisely known in all relevant x,y,z dimensions (and dynamically calculable); and at 619-627 can cause the controller 102 to move the sample 300, 392 past each selected scanning/imaging sensor 120 (or the sensor(s) 120 past the sample 300, 302 as appropriate).

At 630, the controller 102 can cause the system 1000 to conduct an analysis of one or more regions 302 of one or more samples 300. Optionally, controller 102 can parse all command data records of an SID&CDS read at 615 to generate an optimized analysis path for either or both of sample table 202 and sensors 120, based on sensors selected by the operator 90, sample region(s) 302 to be analyzed, and the geometry(ies) of samples to be analyzed, in order for example to reduce overall scanning time, avoid component collisions, and/or maximize surface areas or regions 302 being scanned within a given time frame.

At 631-643, the controller 102 can cause one or more regions 302 of sample(s) 300 to be scanned in accordance with the SID&CDS read at 615, by for example moving each sensor past the corresponding region 302, or vice-versa.

An example of the many powerful advantages offered through implementation of various aspects and embodiments of the invention is the ability of a controller 102 to combine or otherwise correlate adjacent or otherwise-related images and/or other data sets captured by one or more sensors 120 during one or more scanning operations 630. Such processes can include data capture process 630, 640 and retrieval of any useful sensor 120 data, including metadata, and the application by one or more processors 102 of covariance-based alignment strategies.

Covariance techniques, as will be understood by those skilled in the relevant arts, are methods of analyzing and making use of probable relationships between random or apparently random variables through principles of probability statistical theories. Covariance techniques can, for be used to 'stitch' together visual, thermal, or other images taken from adjacent or overlapping regions 302 of samples 300. Such stitched images, or other stitched data sets, can be used to enable an operator 90 of a system 1000 to automatically, semi-automatically, or manually, through the use of interface devices 800 and 104, to evaluate the composition of samples 300 and/or sample regions 302, in order to determine the identity of minerals, elements, or other substances present therein. Once such substances have been identified, controller 102 and controller interface 104 can be used to perform a wide variety of operations, including the evaluation of minerals, elements, and/or other substances present in multiple samples 300, which can be taken from close proximity to one another or at arbitrarily large distances.

Among the advantages offered by the use of covariance techniques for correlating image or other data sets associated with adjacent or otherwise-related sample regions 302 are increased speed of processing, reduction in pre-processing requirements such as cropping or other redaction of data, and the ability to process correlations through reference to reduced types of data (e.g., in some applications visual images can be stitched without need for processing of distinct colors).

As one example, processes of stitching visual, thermal or other image data sets in accordance with such aspects of the invention can be accomplished using a covariance-based alignment strategy that operates at a relatively finer scale parallel to the flow of photographs (e.g., in the 'x' direction shown in FIG. 4) and at a relatively coarser scale perpendicular to the flow of photographs. In such embodiments covariance of the image data can be weighted using a Gaussian distribution across images to reflect, for example, focus and account for the fact that a sample 300 such as a drill core sample may be rounded in shape. In such processes images can be aligned by finding overlapping positions such that the covariance is maximized, or such that the variogram is minimized, between the adjacent photographs.

The use of calibration and sensor-alignment techniques described above can enable pluralities of sensors to be used to acquire multiple types of data from precisely-aligned, or otherwise precisely-correlated, locations on a sample or sample region 300, 302, in addition to combining adjacent or otherwise-related data sets into larger 'images' or correlated sets. Fine spatial registration between such aligned sensors can enable enhancement of the correlation between signals of different data types (e.g., visual, thermal, X-ray, etc.) that are phase-aligned based on discrete Fourier transforms of image data or image-equivalent data, where for example image-equivalent is the representation of non-RGB signals as RGB images. Signal correlation can be improved as more data are aligned due, for example, to the increased availability of information to derive image-equivalent data between sources; hence, the approach can be implemented as an iterative process.

As noted above, among the advantages offered by use of multi-sensor systems 1000 and processes 600 disclosed herein is the ability to significantly increase the quantity and quality of data captured by the system in association with specific, identifiable portions 302 of samples 300, and the speed and efficiency with which such data is captured, by calibrating and aligning sensors 120 of different types, and/or sensors of similar type configured to capture data in accordance with varied parameters—such as filters, aperture settings, frequency tunings, etc.

The quality and efficiency of processes for collocating image and other types of point source data can improved through the use of tags 350 (FIG. 10) placed on the scanned media, i.e. sample 300 or region(s) 302 of samples 300, to enable the precise location of point source samples. For example, using any type of device(s), or combinations of device(s) that are visually, thermally, or otherwise distinguishable by any or all sensors 120 from sample(s) 300 and/or region(s) 302 with which they are used, such tags can enable controller(s) 102 to rapidly, efficiently, and effectively correlated images, maps, and other data sets captured by device(s) 120.

For example, circular or other visually-distinguishable tags 350 bearing machine-interpretable identifiers (e.g., human-readable numbers and characters; QR or bar codes; different, coded colors, or other symbols) can be placed in one or more locations on the surface of, adjacent to, or in other juxtaposition relative to one or more samples 300 or sample portions 302.

At 620 in FIG. 2, controller(s) 102 can manipulate one or more of a table 202 and sensor(s) 120 to place a sample 300/region 302 bearing one or more tags 350 in desired juxtaposition(s) with respect to a selected set of sensors 120, can cause indicia borne by the tag(s) 350 to be read and interpreted by any desired combinations of sensor(s) 120 and controller(s) 102, and can use both the location(s) of the tag(s) and any interpreted information to enable capture by any desired sensors 120 of data tied to specific location(s) within specific sample(s), and to store such data in memory (ies) 106, 108 in association with the captured information.

Figure 10:
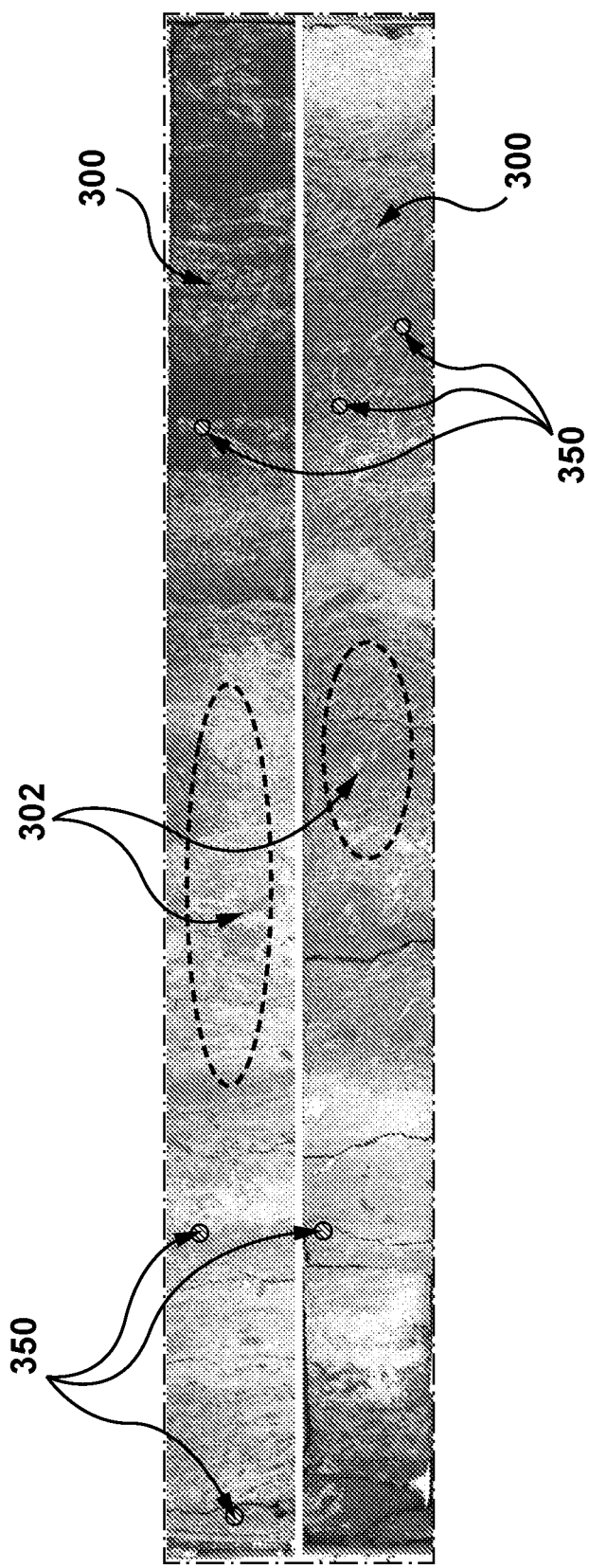
FIG. 10 is a schematic diagram illustrating examples of geological samples prepared for analysis by multi-sensor geological analysis systems in accordance with various aspects and embodiments of the invention.

As one example, as shown in FIGS. 2 and 10, at 620 image recognition techniques can be used to identify one or more different colors and/or shapes and/or patterns, including for example green, grey, and/or other colored tags 350 and to use them in assigning associating any desired information with a sample 300 or sample region 302, including for example actual or relative location(s) of minerals or other features of interest, sample history (ies), etc. Known geographic locations of tag(s) 350 can be used, for example, as references in locating known features, and/or for any other of a very wide variety of purposes. A spatial search based at least partly, for example, on three-dimensional LIDAR mapping of one or more sample region(s) 302 can be tied to a regression calibration algorithm that derives the highest likely point sample positions that yield the lowest and least biased residual variance. Line scan data collected from a LIDAR readings captured by sensor(s) 120, 125 can be collocated in a similar manner; using for example positional errors of individual recordings along a line of samples from a rigid tool is associated with the scale of representation of the physics of the scan type.

As a part of a calibration process 620, one or more corrections or other adjustments can be applied by suitable modification of operating parameters of devices 120. Such corrections or adjustments can, for example, include geometric, radiance-to-reflection and other forms of noise reduction, and other accommodations in addition to noise reduction.

As one example use of a calibration process 620 to reduce noise in data captured by a device 120, hyperspectral scans captured by one or more hyperspectral imagers 120, 122 can be filtered to reduce noise in four stages. For example, first a dark current adjustment can be applied to remove noise and drift from the camera after which radiance can be converted to reflectance using appropriate calibration materials; second, reflectance can be adjusted to derive absorbance, which can be further filtered to remove noise by minimizing the mean squared error between all pixels on the line scan sensor; third, fine scale noise is removed by zeroing the shortest scale variations through a FFT filter; and lastly the scan can be convoluted with a Gaussian kernel.

Calibration process(es) 620 can include various types of quality control checks, including for example capture of data from calibration device(s) 850 and comparison of captured data to known reference values. For example, capture of an RGB image of a color panel 850 using a camera 120, 121, and comparison of captured data to known color reference values stored in memory(ies) 106, 108 by controller(s) 102 can be use to correct settings on the camera 121 to avoid over- or under-exposure; and capture and comparison of an image having sharp, well defined regions over a relatively large area such as a checkerboard device 853 can be used, through comparison and/or other image interpretation processes, to correct a desired focus of a camera 121, etc.

Processing of data at 643 can include identification of minerals and other materials comprised by samples 300, which can for example be conducted in fully- and/or semi-automated fashion by controllers 102, and/or manually by operator(s) 90 using controller interfaces 104 For example, autocropping, photographic and hyperspectral signals, can be differentiated into core materials, non-core materials and low quality signals through the use of local and/or remote neural-network and/or other types of classification algorithms. Remote and/or local material libraries can provide guidance for the system 1000 in making preliminary material classifications, after which a scan-specific dynamic material data library can be generated and stored in memory (ies) for continuous machine-learning processes using defined classification algorithms.

Automated and semi-automated data interpretation techniques can be applied at 643, etc., for a wide variety of purposes in assessing data captured by sensors 120. For example, the magnitude of hyperspectral radiance signatures can be highly correlated with the topography of scanned sample material; whereas cracks in samples 300 can be associated with weak, noisy signals and thin cracks can be characterized by relatively darker pixel values in photographs. Thick cracks can be associated with poor focus and non-core material hyperspectral signals. Photographic and hyperspectral information sources are combined into a crack detection algorithm that performs a binary segmentation of the data into crack and non-crack regions.

Processing at 643 can further include, for each sample area component 302, generating base analyses to determine any properties of interest derivable from data captured by the selected suite of sensors 120. For example, textures and proportions inferred from variations in color and/or other sensed properties of samples can be used to identify the content of samples, and machine learning techniques may be applied in order to improve the efficiency and accuracy of results. For example, using such techniques maps of materials may be further broken down into constituents and local proportions of each constituent material can be derived using technique such as non-linear classification regimes for segregation followed by non-negative matrix factorization and non-negative least squares for proportion derivation.

As a specific example of the use of multiple sensors 120 to identify substances present in samples 300, libraries 106, 108 comprising data representing absorbance properties of sample materials can be compared to absorbance scans to determine the types and proportions of muds, clays, and other substances present within a scan of core material. Potentially present clay types, for example, can be calibrated using the results of scans by XRF 124 that may or may not have been calibrated using X-ray diffraction (XRD). In the absence calibrated clay types, manually derived training libraries may be constructed and utilized. Identified clays can, for example, be utilized in building scan-specific mineral libraries, along with feature matching and non-negative least squares to derive the proportions of each clay type present within the pixels of a scan.

Another significant advantage offered by systems 1000 and methods 600 in accordance with the invention is improvement in processes for the mapping of minerals. For example, by analyzing samples 300 taken from a variety of locations in a given geographic region, and by applying mathematical, statistical, and other tools, to the presence and distribution of various minerals within such samples, maps of mineral deposits can be created, and used for example in extractive processes.

In addition to extractive applications, such information can be used to detect the presence of minerals that define distinct geologic zones, for use for example in understanding geography, geological history, fault lines etc. For example, variations in crystallinity and peak shift can be used to identify shifts in geological features.

As will be understood by those skilled in the relevant arts, a great number of geological features and phenomena can be used to distinguish minerals and other substances in geological samples. Examples include the relative and absolute size of substance grains and crystals, and the orientation and other formational features of such grains and crystals. Such features and phenomena can be used to assess the composition of samples by, for example the use of data-driven prediction models constructed to utilize co-located scan information capture as described above, for predicting properties such as proportion measurements, volumetric measurements, and/or measured physical attributes. Mathematical and/or statistical prediction models adapted to accomplish this task can be designed specific to the type of measurement, but in general the relationships between scanned quantities and measured quantities are non-linear, clustered, and scale dependent requiring a series of algorithms. Constraints such as additivity can be imposed, in order to ensure that they are properly reflected by corresponding predictive models.

Among the advantages offered by multi-sensor systems 1000 in accordance with various aspects and embodiments of the invention is the ability to conduct calibration and data-capture operations 620, 620; automatically and/or manually assess data captured by such operations; and, using the same and or other sensors 120, re-scan all or various portions of the samples 300 or regions 302 in order to gather further data useful in identifying substances and geological features. For such purposes, through the use of suitably-adapted processes 620, 630 sensors 120 can be reconfigured, both through selection of modified pluralities of sensors 120 and/or by modifying operational settings of some or all of the selected sensors, as previously described. Processes 620, 630 can be repeated, and varied, as often as desired, using any desired combination(s) of sensor(s) 120 and any desired operational configurations of selected sensors. For example, a previously-scanned sample 300 can be re-scanned using the same or other sensors 120, with color, frequency, or other types of filters applied, in order to generate enhanced attribute data sets representing optimized interpretations of attributes associated with portions 302 of the geological sample 300.

For example, as shown in FIGS. 11A and 11B, a system 1000 can be used to identify valuable or otherwise desirable minerals (or other substances) in samples 300 by identifying the desired minerals directly, and/or by investigating deposits of other substances commonly associated with their presence. For example, in some geological structures various forms of garnet and/or other materials are known to appear in association with diamonds. Thus, a system 1000 can be configured to analyze region(s) 302 of a sample 300, in search of diamonds, by looking first for potentially larger or otherwise more prominent deposits of garnet, olivine, kimberlite, calcite, ilmenite, chromite, magnetite, diopside, and/or pyrope garnet, through the use of LIBS, photographic cameras, and/or other sensor instrument(s) 120, 121, 126, etc. Such a process can, for example, include calibrating selected sensor(s) 120, 126, etc., at 620 and at 630 scanning a first region 302s as shown in FIG. 11A with selected sensor(s) 120, 126 etc. By for example scanning the region, completing laser-induced breakdown and spectroscopy of portions of the region likely to contain garnets, olivine deposits, etc., confirming their composition(s) and locations, the system 1000 and/user(s) 90 can identify further region(s) 302b, likely to contain deposits of desired substances, or other substances believed to be associated therewith, which can for example include entirely distinct regions and/or whole or partial subsets of original region(s) 302. With follow-up region(s) 302b defined, the same or another set of sensor(s) 120 can be selected, and further scanning can be conducted, e.g., including any or all of finer resolution(s), re-tuning or other recalibration, use of different sensor(s), etc., and more detailed and/or other confirmatory attribute data can be captured. Among other advantages, data describing the distribution of such substances in samples 300 can be used in conjunction with data representing the location(s) of origin of such samples by controller(s) 102 and/or user(s) 90 to generate maps indicating the known or predicted geographic location(s) of deposits of such desirable substances.

Thus, in various aspects and embodiments the invention provides systems, methods, devices, and machine-readable, persistent media representing instructions configured to cause one or more controllers 102 of a multi-sensor geological analysis system 1000 to receive from at least one operator input device 90 one or more signals representing a first multi-sensor control instruction set, comprising data representing instructions for setting operating parameters of a first sensor set comprising one or more of a plurality of sensors 120, 121, 122, 123, 124, 125, 126, 127, 128, 129, etc., to configure the one or more sensors 120, etc., for collection of data representing one or more physical attributes of at least one region 302, 302a of a geological sample 300 associated with a geographical location; in accordance with instructions received from the at least one operator input device 90, cause the one or more configured sensors 120 to capture a first geological attribute data set comprising data representing a plurality of physical attributes of the at least one common region of the geological sample; cause some or all of the first geological attribute data set to be stored in persistent machine-readable memory 108; receive from the same or another operator input device 90 one or more signals representing a second multi-sensor control instruction set comprising data representing instructions for setting operating parameters of a second sensor set comprising the same or another one or more sensors 120, for collection of data representing one or more physical attributes of the same or another common region 302, 302a, 302b of the same or another geological sample 300, the instructions based at least partly on attributes represented by the first geological attribute data set; in accordance with instructions received from the at least one operator input device 90, causing the second sensor set to capture a second geological attribute data set comprising data representing a plurality of the same or other physical attributes of the same or another common region 302, 302a, 302b of the geological sample 300; causing some or all of the second geological attribute data set to be stored in persistent machine-readable memory 108; and based at least partly on analysis of geological attributes represented by the first and second geological attribute data sets, identifying one or more substances comprised by the geological sample 300.

As another example, based on an initial scanning process 620, 630 described above, an operator 90 of a system 1000 may determine that there exist within a sample 300 one or more areas of interest that need to be re-scanned with scanning/imaging sensor(s) 120 with different settings, or scanned with a new selection of sensors. For example, for a spot/spots "X" containing a mineral "Y" that cannot be identified with default or other initial sensors/settings, the operator 90 who has determined that an XRF signal has been detected during scanning operation 630, but that the signal is insufficient for relevant identification and/or quantification purposes, can use a controller interface 104 to configure new sessions 620, 630 to re-scan all or portions 302 of a sample 300, using an XRF sensor configured for spot or line floating XRF operations, with a longer exposure setting or different frequency or power settings.

Similarly, during an initial scan 620, 630, such an operator 90 can determine that improved light levels or other conditions are desirable in order to identify minerals using either or both of helium flood XRF or LIBS sensors 120 can use processes 620, 630 to reconfigure the system 1000 and capture data helpful in such identification.

Use of various sensors, and combinations of sensors, 120, along with position sensors associated with sample tables 202 and sensor mounts, to differentiate between materials can also be used to distinguish sample areas 302 from non-sample areas prior to or during scanning operations 620, 630. For example, RGB cameras 121 and other sensors 120 can be used to determine that an area 302 (i) contains nothing, (ii) contains a material that is not a geological sample; (iii) or contains a material that is a geological sample but is damaged or should otherwise not be included in the analysis. Examples include use of a laser profiler 125 to determine that an area 302 has a depth or lateral location well beyond expected locations for surfaces of samples 300, or to determine that a sample 300 has a surface contour that is not conducive to efficient capture of desired sensor date (e.g., is insufficiently flat or smooth, or is sloped away from a sensor. Similarly, a hyperspectral imager can be used to determine that a scanned material that is not geological, e.g., it consists of or includes plastic, wood, cardboard, ink, or chalk, etc.; and/or an RGB camera 121 can be used to determine that a color of a region 302 is not consistent with geological material, e.g., it corresponds to labels, tags, etc., used to mark sample sources or reference points on samples.

A further advantageous feature offered by aspects and embodiments of the invention is the ability, with respect to sets of associated sample 300, for example multiple portions of a single drill core sample stored in separate boxes, to digitally store and index at 643, using for example interface menus 806, 808, all data captured with respect to each sample 300 and sample 302 area such that all data having desired spatial relevance can be recalled from the associated samples. For example, all data collected from a single well or drill hole can be stored together through the use of suitable identifiers. The storage and access of such comprehensive data sets from specific geographic sites can be used, for example, for multiple studies or analyses over time, even periods of years or decades. In effect, complete geological maps of entire regions can be constructed, analyzed, and used for a very wide variety of purposes.

Thus in accordance with various aspects and embodiments the invention provides methods 600 of analyzing geological features, the methods performed by at least one controller 102 of a multi-sensor geological analysis system 1000 and comprising receiving from at least one operator input device 104 one or more signals representing a selection of some or all of a plurality of sensors 120 for collection of data representing one or more physical attributes of at least one common region 302 of a first geological sample 300 associated with a first geographical location; in accordance with instructions received from the same or another operator input device 104, causing the plurality of selected sensors 120 to capture a first geological data set comprising data representing a plurality of physical attributes of the first geological sample 300; causing some or all of the first geological data set to be stored in persistent machine-readable memory 106, 108; receiving from the same or another operator input device 104 one or more signals representing a second selection of the same or another plurality of sensors for collection of data representing one or more physical attributes of at least one common region of a second geological sample associated with a second geographical location; in accordance with instructions received from the same or the other operator input device 104, causing the plurality of sensors 120 associated with the second selection to capture a second geological data set comprising data representing a plurality of physical attributes of the second geological sample 300, 302; and causing some or all of the second geological data set to be stored in persistent machine-readable memory 106, 108; and based at least partly on analysis of geological attributes represented by the first and second geological data sets, generate data representing a map of at least one geological feature associated with the first and second geographical locations.

In addition to such geological mapping techniques, the capture of multiple types of data from entire sample sets, and the use of stitching and other correlation techniques as described above can be used to correct improperly catalogued or indexed data, for example down-hole core data that has been stored in association with improper well-depth data.

Thus in various aspects and embodiments the invention provides methods 600 in which first and second sets of captured data can be associated with at least partially distinct portions 302 of one or more geological sample, and the same or another controller can geospatially correlate the data using, for example, mathematical covariance techniques. Such correlations can further, or alternatively be made using spatial and spectral decomposition techniques, and/or tags 350 physically associated with known positions relative to the geological sample 300.

Thus in the same and other aspects and embodiments the invention provides, for example, methods 600 of analyzing geological and other samples in which at least one controller 102, subsequent to causing a selected plurality of sensors 120 to capture data representing a plurality of physical attributes of at least one region 302 of a geological sample 300, and based at least partly on assessment of data captured by at least one of the plurality of selected sensors 120, to change the selected plurality of sensors to include at least one different sensor 120 and cause the at least one different selected sensor 120 to capture additional data representing one or more of the same or other physical attributes of the at least one region 302 of the geological sample 300.

General

Through the descriptions of the preceding embodiments, the present disclosure may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present disclosure may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure and its advantages have been described in detail, it should be understood that various changes, substitutions and alterations can be made herein without departing from the present disclosure as defined by the appended claims.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of analyzing geological features, the method performed by at least one controller of a multiple-sensor geological analysis system, the method comprising:

performing a first sensor scan of a first geological sample in accordance with a first sensor control instruction set, the first sensor control instruction set comprising instructions for setting operating parameters of a first sensor set for collection of data representing one or more geological attributes of a region of the first geological sample, the first geological sample being associated with a first geographical location, the first sensor scan generating a first geological attribute data set comprising the data representing the one or more geological attributes of the region of the first geological sample, the first sensor set comprising one or more sensors;

performing a second sensor scan of a second geological sample in accordance with a second sensor control instruction set different from the first instruction set, the second sensor control instruction set comprising instructions for setting operating parameters of a second sensor set for collection of data representing one or more geological attributes of a region of the second geological sample, the second sensor control instruction set being based at least partly on the first geological attribute data set generated by the first sensor scan, the second sensor scan generating a second geological attribute data set comprising the data representing the one or more geological attributes of the region of the second geological sample, the second geological sample being associated with a second geographical location, the second sensor set comprising one or more sensors including at least one sensor that is different than the first sensor set and selected based at least partly on the first geological attribute data set generated by the first sensor scan; and identifying one or more substances comprised by the first and second geological samples based at least partly on analysis of the first and second geological attribute data sets.

2. The method of claim 1, wherein the one or more sensors comprise one or any combination of a red-green-blue (RGB) high-resolution digital camera, a spectrographic sensor, a hyperspectral sensor, an X-ray fluorescence (XRF) sensor, an ultraviolet (UV) fluorescence sensor, a three-dimensional profiling device, a laser-induced breakdown spectrometer (LIBS), gamma scintillation spectrometer, or thermal camera.

3. The method of claim 2, wherein the first and second geological samples are the same.

4. The method of claim 2, wherein
the operating parameters of the second sensor set used in the second sensor scan are different from the operating parameters of first sensor scan, the operating parameters of the second sensor set used in the second sensor scan being based at least partly on the first geological attribute data set generated by the first sensor scan.

5. The method of claim 1, wherein:
the first and second geological samples are the same;
the first sensor set comprises a three-dimensional profiling device; and
the second sensor set comprises any one of a combination of a red-green-blue (RGB) high-resolution digital camera, a spectrographic sensor, a hyperspectral sensor, an X-ray fluorescence (XRF) sensor, an ultraviolet (UV) fluorescence sensor, a laser-induced breakdown spectrometer (LIBS), gamma scintillation spectrometer, or thermal camera; and
the method further comprises determining a travel path for the second sensor set used in the second sensor scan.

6. The method of claim 1, wherein setting the at least one operating parameters comprises at least one of:
initializing at least one of the one or more sensors;
physically or virtually orienting, focusing or tuning the at least one of the sensors; and
setting a filter, color, wavelength, exposure time, aperture setting, or frequency range of the at least one of the sensors.

7. The method of claim 1, wherein setting the operating parameters comprises:
causing the one or more sensors to collect data associated with a known reference sample; and
setting one or more of the operating parameters to optimize desired data collection characteristics of the one or more sensors.

8. The method of claim 1, comprising a plurality of sensors operable in accordance with respective operating parameters, wherein setting the operating parameters for at least two sensors comprises adjusting the sensors such that the sensors are configured to collect data from a commonly-defined spatial region.

9. The method of claim 1, wherein a relative orientation of at least one of the sensors with respect to a sample support is configurable by the controller in at least one degree of freedom, and the method comprises, in accordance with signals received by the controller from the same or another operator input device, changing a configuration of the at least one of the sensors relative to the sample support in at the least one degree of freedom.

10. The method of claim 1, wherein the first and second geological samples are the same geological sample, and the first and second geological attribute data sets are associated with at least partially distinct portions of the geological sample, and the same or another controller causes the data to be geospatially correlated using at least one of:
mathematical covariance techniques;
spatial and spectral decomposition techniques; or
tags physically associated with known positions relative to the geological sample.

11. The method of claim 1, further comprising generating the second sensor control instruction set based at least partly on the first geological attribute data set.

12. The method of claim 1, further comprising, prior to performing the first scan, calibrating at least one sensor of the one or more sensors, comprising moving one or more calibration devices into a position for calibrating the at least one sensor of the one or more sensors.

13. The method of claim 1, further comprising controlling one or more environmental control devices for one or more enclosures enclosing the first and second geological samples.

14. The method of claim 1, further comprising:
filtering some or all of the collected data to generate enhanced attribute data sets representing optimized interpretations of attributes associated with portions of the geological sample.

15. The method of claim 1, further comprising:
generating data representing a map of the identified one or more substances in at least one geological feature associated with the first and second geographical locations based at least partly on analysis of the first and second geological attribute data sets.

16. The method of claim 15, further comprising:
determining or predicting a location of the identified one or more substances in the at least one geological feature associated with the first and second geographical locations based at least partly on analysis of the first and second geological attribute data sets.

17. The method of claim 1, further comprising:
generating a map of the identified one or more substances in at least one geological feature associated with the first and second geographical locations based at least partly on analysis of the first and second geological attribute data sets.

18. A geological analysis system comprising:
a plurality of sensors each configured to collect data representing one or more geological attributes of a geological sample, at least at one of the sensors in plurality of sensors is operable in accordance with a plurality of adjustable operating parameters;
a controller; and
a memory coupled to the controller, the memory storing executable instructions that, in response to execution by the controller, cause the controller to:

perform a first sensor scan of a first geological sample in accordance with a first sensor control instruction set, the first sensor control instruction set comprising instructions for setting operating parameters of a first sensor set for collection of data representing one or more geological attributes of a region of the first geological sample, the first geological sample being associated with a first geographical location, the first sensor scan generating a first geological attribute data set comprising data representing the one or more geological attributes of the region of the first geological sample, the first sensor set comprising one or more sensors;

perform a second sensor scan of a second geological sample in accordance with a second sensor control instruction set different from the first instruction set, the second sensor control instruction set comprising instructions for setting operating parameters of a second sensor set for collection of data representing one or more geological attributes of a region of the second geological sample, the second sensor control instruction set being based at least partly on the first geological attribute data set generated by the first sensor scan, the second sensor scan generating a second geological attribute data set comprising the data representing the one or more geological attributes of the region of the second geological sample, the second geological sample being associated with a second geographical location, the second sensor set comprising one or more sensors including at least one sensor that is different than the first sensor set and selected based at least partly on the first geological attribute data set generated by the first sensor scan; and identify one or more substances comprised by the first and second geological samples based at least partly on analysis of the first and second geological attribute data sets.

19. The geological analysis system of claim 18, further comprising:
one or more frames to support a plurality of sensor mounts, each sensor mount independently configurable in at least one degree of freedom and adapted to support at least one of the sensors in the plurality of sensors; and
a sample support component configured to support at least one geological sample, wherein at least one of the frames and the sample support component is spatially orientable with respect to the other in accordance with signals generated by the controller.

20. The geological analysis system of claim 19, wherein the frames comprise a mobile chassis.

21. The geological analysis system of claim 20, wherein the mobile chassis is towable or self-propelled.

22. A method of analyzing geological features, the method performed by at least one controller of a multiple-sensor geological analysis system, the method comprising:
performing a first sensor scan of a first geological sample in accordance with a first sensor control instruction set, the first sensor control instruction set comprising instructions for setting operating parameters of a first sensor set for collection of data representing one or more geological attributes of a region of the first geological sample, the first geological sample being associated with a first geographical location, the first sensor scan generating a first geological attribute data set comprising the data representing the one or more geological attributes of the region of the first geological sample, the first sensor set comprising one or more sensors;

performing a second sensor scan of a second geological sample in accordance with a second sensor control instruction set different from the first instruction set, the second sensor control instruction set comprising instructions for setting operating parameters of a second sensor set for collection of data representing one or more geological attributes of a region of the second geological sample, the second sensor control instruction set being based at least partly on the first geological attribute data set generated by the first sensor scan, the second sensor scan generating a second geological attribute data set comprising the data representing the one or more geological attributes of the region of the second geological sample, the second geological sample being associated with a second geographical location, the second sensor set comprising one or more sensors including at least one sensor that is different than the first sensor set; and identifying one or more substances comprised by the first and second geological samples based at least partly on analysis of the first and second geological attribute data sets, wherein operating parameters of the at least one different sensor are selected based at least partly on the first geological attribute data set generated by the first sensor scan.

23. The method of claim 22, wherein the one or more sensors comprise one or any combination of a red-green-blue (RGB) high-resolution digital camera, a spectrographic sensor, a hyperspectral sensor, an X-ray fluorescence (XRF) sensor, an ultraviolet (UV) fluorescence sensor, a three-dimensional profiling device, a laser-induced breakdown spectrometer (LIBS), gamma scintillation spectrometer, or thermal camera.

24. The method of claim 23, wherein the first and second geological samples are the same.

25. The method of claim 23, wherein the operating parameters of the second sensor set used in the second sensor scan are different from the operating parameters of first sensor scan, the operating parameters of the second sensor set used in the second sensor scan being based at least partly on the first geological attribute data set generated by the first sensor scan.

26. The method of claim 22, wherein:
the first and second geological samples are the same;
the first sensor set comprises a three-dimensional profiling device;
the second sensor set comprises any one of a combination of a red-green-blue (RGB) high-resolution digital camera, a spectrographic sensor, a hyperspectral sensor, an X-ray fluorescence (XRF) sensor, an ultraviolet (UV) fluorescence sensor, a laser-induced breakdown spectrometer (LIBS), gamma scintillation spectrometer, or thermal camera; and
the method further comprises determining a travel path for the second sensor set used in the second sensor scan.

27. The method of claim 22, wherein setting the operating parameters comprises at least one of:
initializing at least one of the one or more sensors;
physically or virtually orienting, focusing or tuning the at least one of the sensors; and setting a filter, color, wavelength, exposure time, aperture setting, or frequency range of the at least one of the sensors.

28. The method of claim 22, wherein setting the operating parameters comprises:
causing the one or more sensors to collect data associated with a known reference sample; and
setting one or more of the operating parameters to optimize desired data collection characteristics of the one or more sensors.

29. The method of claim 22, comprising a plurality of sensors operable in accordance with respective operating parameters, wherein setting the operating parameters for at least two sensors comprises adjusting the sensors such that the sensors are configured to collect data from a commonly-defined spatial region.

30. The method of claim 22, wherein a relative orientation of at least one of the sensors with respect to a sample support is configurable by the controller in at least one degree of freedom, and the method comprises, in accordance with signals received by the controller from the same or another operator input device, changing a configuration of the at least one of the sensors relative to the sample support in at the least one degree of freedom.

31. The method of claim 22, wherein the first and second geological samples are the same geological sample, and the first and second geological attribute data sets are associated with at least partially distinct portions of the geological sample, and the same or another controller causes the data to be geospatially correlated using at least one of:
mathematical covariance techniques;
spatial and spectral decomposition techniques; or
tags physically associated with known positions relative to the geological sample.

32. The method of claim 22, further comprising:
filtering some or all of the collected data to generate enhanced attribute data sets representing optimized interpretations of attributes associated with portions of the geological sample.

33. The method of claim 22, further comprising:
generating data representing a map of the identified one or more substances in at least one geological feature associated with the first and second geographical locations based at least partly on analysis of the first and second geological attribute data sets.

34. The method of claim 33, further comprising:
determining or predicting a location of the identified one or more substances in the at least one geological feature associated with the first and second geographical locations based at least partly on analysis of the first and second geological attribute data sets.

35. The method of claim 22, further comprising:
generating a map of the identified one or more substances in at least one geological feature associated with the first and second geographical locations based at least partly on analysis of the first and second geological attribute data sets.

36. The method of claim 22, further comprising generating the second sensor control instruction set based at least partly on the first geological attribute data set.

37. The method of claim 22, further comprising, prior to performing the first scan, calibrating at least one sensor of the one or more sensors, comprising moving one or more calibration devices into a position for calibrating the at least one sensor of the one or more sensors.

38. The method of claim 22, further comprising controlling one or more environmental control devices for one or more enclosures enclosing the first and second geological samples.

39. A geological analysis system comprising:
a plurality of sensors each configured to collect data representing one or more geological attributes of a geological sample, at least at one of the sensors in plurality of sensors is operable in accordance with a plurality of adjustable operating parameters;
a controller; and
a memory coupled to the controller, the memory storing executable instructions that, in response to execution by the controller, cause the controller to:
perform a first sensor scan of a first geological sample in accordance with a first sensor control instruction set, the first sensor control instruction set comprising instructions for setting operating parameters of a first sensor set for collection of data representing one or more geological attributes of a region of the first geological sample, the first geological sample being associated with a first geographical location, the first sensor scan generating a first geological attribute data set comprising data representing the one or more geological attributes of the region of the first geological sample, the first sensor set comprising one or more sensors;
perform a second sensor scan of a second geological sample in accordance with a second sensor control instruction set different from the first instruction set, the second sensor control instruction set comprising instructions for setting operating parameters of a second sensor set for collection of data representing one or more geological attributes of a region of the second geological sample, the second sensor control instruction set being based at least partly on the first geological attribute data set generated by the first sensor scan, the second sensor scan generating a second geological attribute data set comprising the data representing the one or more geological attributes of the region of the second geological sample, the second geological sample being associated with a second geographical location, the second sensor set comprising one or more sensors including at least one sensor that is different than the first sensor set; and
identify one or more substances comprised by the first and second geological samples based at least partly on analysis of the first and second geological attribute data sets,
wherein operating parameters of the at least one different sensor are selected based at least partly on the first geological attribute data set generated by the first sensor scan.

40. The geological analysis system of claim 39, further comprising:
one or more frames to support a plurality of sensor mounts, each sensor mount independently configurable in at least one degree of freedom and adapted to support at least one of the sensors in the plurality of sensors; and
a sample support component configured to support at least one geological sample, wherein at least one of the frames and the sample support component is spatially orientable with respect to the other in accordance with signals generated by the controller.

41. The geological analysis system of claim 40, wherein the frames comprise a mobile chassis.

42. The geological analysis system of claim 41, wherein the mobile chassis is towable or self-propelled.

43. A method of analyzing geological features, the method performed by at least one controller of a multiple-sensor geological analysis system, the method comprising:
performing a first sensor scan of a first geological sample in accordance with a first sensor control instruction set, the first sensor control instruction set comprising instructions for setting operating parameters of a first sensor set for collection of data representing one or more geological attributes of a region of the first geological sample, the first geological sample being associated with a first geographical location, the first sensor scan generating a first geological attribute data set comprising the data representing the one or more geological attributes of the region of the first geological sample, the first sensor set comprising one or more sensors;
performing a second sensor scan of a second geological sample in accordance with a second sensor control instruction set different from the first instruction set, the second sensor control instruction set comprising instructions for setting operating parameters of a second sensor set for collection of data representing one or more geological attributes of a region of the second geological sample, the second sensor control instruction set being based at least partly on the first geological attribute data set generated by the first sensor scan, the second sensor scan generating a second geological attribute data set comprising the data representing the one or more geological attributes of the region of the second geological sample, the second geological sample being associated with a second geographical location, the second sensor set comprising one or more sensors including at least one sensor that is different than the first sensor set; and
identifying one or more substances comprised by the first and second geological samples based at least partly on analysis of the first and second geological attribute data sets,
wherein setting the operating parameters comprises:
causing the one or more sensors to collect data associated with a known reference sample; and
setting one or more of the operating parameters to optimize desired data collection characteristics of the one or more sensors.

44. A method of analyzing geological features, the method performed by at least one controller of a multiple-sensor geological analysis system, the method comprising:
performing a first sensor scan of a first geological sample in accordance with a first sensor control instruction set, the first sensor control instruction set comprising instructions for setting operating parameters of a first sensor set for collection of data representing one or more geological attributes of a region of the first geological sample, the first geological sample being associated with a first geographical location, the first sensor scan generating a first geological attribute data set comprising the data representing the one or more geological attributes of the region of the first geological sample, the first sensor set comprising one or more sensors;
performing a second sensor scan of a second geological sample in accordance with a second sensor control instruction set different from the first instruction set, the second sensor control instruction set comprising instructions for setting operating parameters of a second sensor set for collection of data representing one or more geological attributes of a region of the second geological sample, the second sensor control instruction set being based at least partly on the first geological attribute data set generated by the first sensor scan, the second sensor scan generating a second geological attribute data set comprising the data representing the one or more geological attributes of the region of the second geological sample, the second geological sample being associated with a second geographical location, the second sensor set comprising one or more sensors including at least one sensor that is different than the first sensor set; and
identifying one or more substances comprised by the first and second geological samples based at least partly on analysis of the first and second geological attribute data sets,
wherein the first and second geological attribute data sets are associated with at least partially distinct portions of the geological sample, and the same or another controller causes the data to be geospatially correlated using tags physically associated with known positions relative to the geological sample.

* * * * *